United States Patent
Johnson, III et al.

(10) Patent No.: US 11,874,839 B2
(45) Date of Patent: *Jan. 16, 2024

(54) ADAPTIVE BIG DATA SERVICE

(71) Applicant: Open Text SA ULC, Halifax (CA)

(72) Inventors: Claiborne Holt Johnson, III, Austin, TX (US); Michael Gerard Jaskiewicz, Urbandale, IA (US)

(73) Assignee: Open Text SA ULC, Halifax (CA)

( * ) Notice: Subject to any disclaimer, the term of this patent is extended or adjusted under 35 U.S.C. 154(b) by 0 days.

This patent is subject to a terminal disclaimer.

(21) Appl. No.: 17/511,441

(22) Filed: Oct. 26, 2021

(65) Prior Publication Data

US 2022/0164356 A1 May 26, 2022

Related U.S. Application Data

(63) Continuation of application No. 16/503,186, filed on Jul. 3, 2019, now Pat. No. 11,194,813.

(60) Provisional application No. 62/694,701, filed on Jul. 6, 2018.

(51) Int. Cl.
  *G06F 16/00* (2019.01)
  *G06F 16/2455* (2019.01)
  *G06F 16/22* (2019.01)

(52) U.S. Cl.
  CPC ...... *G06F 16/24556* (2019.01); *G06F 16/221* (2019.01); *G06F 16/2219* (2019.01)

(58) Field of Classification Search
  CPC ............ G06F 16/24556; G06F 16/221; G06F 16/2219; G06F 16/213
  See application file for complete search history.

(56) References Cited

U.S. PATENT DOCUMENTS

| | | | |
|---|---|---|---|
| 2012/0117120 A1* | 5/2012 | Jacobson | G06F 16/2455 715/838 |
| 2013/0173669 A1* | 7/2013 | Tang | G06F 16/211 707/E17.044 |
| 2014/0012619 A1* | 1/2014 | Natarajan | H04L 51/52 705/7.19 |
| 2017/0279840 A1* | 9/2017 | Zhang | H04L 63/1425 |
| 2017/0286502 A1* | 10/2017 | Bar-Or | G06F 8/34 |
| 2018/0096165 A1* | 4/2018 | Warshavsky | G06F 16/2282 |

* cited by examiner

*Primary Examiner* — Syed H Hasan
(74) *Attorney, Agent, or Firm* — Sprinkle IP Law Group

(57) ABSTRACT

An event processing system comprising a processor and a non-transitory computer readable medium coupled to the processor. The non-transitory computer readable medium stores computer-readable code executable to provide a domain-agnostic service for analyzing data and processing heterogeneous events conforming to a plurality of schemas using the service. The domain-agnostic service comprises an adaptive data model and an adaptive processing model. The adaptive data model supports runtime event type discovery and event schema management that reacts to new schemas discovered at runtime. The adaptive processing model supports configurable partitioning of events by event type and time and is reactive to create new aggregations and analyses based on the propagation of new partitions.

20 Claims, 21 Drawing Sheets

| Name | DataType | Nullable |
|---|---|---|
| id | String | true |
| firstName | String | true |
| lastName | String | true |
| email | String | true |
| geoIp | Object | true |

FIG. 2A

GeoIp

| Name | DataType | Nullable |
|---|---|---|
| city | String | true |
| country | String | true |
| latitude | Number | true |
| longitude | Number | true |
| region | String | true |

FIG. 2B

```
{
    "expctr": {
        "tenant": "0b8a9f00-11fa-44ec-83b4-e88f7627d862",
        "schemaSource": "email",
        "schemaType": "sent",
        "schemaVersion": "1.0"
    },
    "user": {
        "id": "alice@xyz.com",
        "firstName": "Alice",
        "lastName": "Toy"
        "email": "alice@xyz.com",
        "geoIp": {
            "city": "Paris",
            "region": "Île-de-France",
            "country": "France",
            "latitude": 48.864716,
            "longitude": 2.349014,
        }
    },
    "campaignId": "Program Registration",
    "data": {
    "subject": "Join us at our Big Event 2019!"
    }
}
```

150
152
154
156

| name | datatype | nullable |
|---|---|---|
| expctr.tenant | string | false |
| expctr.schemaSource | string | false |
| expctr.schemaType | string | false |
| expctr.schemaVersion | string | false |
| user.id | string | true |
| user.firstName | string | true |
| user.lastName | string | true |
| user.email | string | true |
| user.geoIP.city | string | true |
| user.geoIP.country | string | true |
| user.geoIP.latitude | number | true |
| user.geoIP.longitude | number | true |
| user.geoIP.region | string | true |
| campaignID | string | true |
| data.subject | string | true |

```
{
    "expctr": {
        "tenant": "0b8a9f00-11fa-44ec-83b4-e88f7627d862",
        "schemaSource": "website",
        "schemaType": "pagevisit",
        "schemaVersion": "1.0"
    },
    "user": {
        "id": "john@xyz.com",
        "firstName": "John",
        "lastName": "Doe",
        "email": "john@xyz.com",
        "geoIp": {
            "city": null
        }
    },
    "URL": "https://www.xyz.com/campaigns/big_event_2019",
    datetime: 2019-05-28T16:05:12.427Z
}
```
— 160

162 (expctr block)

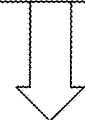

| name | datatype | nullable |
|---|---|---|
| expctr.tenant | string | false |
| expctr.schemaSource | string | false |
| expctr.schemaType | string | false |
| expctr.schemaVersion | string | false |
| user.id | string | true |
| user.firstName | string | true |
| user.lastName | string | true |
| user.email | string | true |
| user.geoIP.city | string | true |
| user.geoIP.country | string | true |
| user.geoIP.latitude | number | true |
| user.geoIP.longitude | number | true |
| user.geoIP.region | string | true |
| URL | string | true |
| datetime | ISO8061 | true |

```
{                                                                    170
    "expctr": {
        "tenant": "0b8a9f00-11fa-44ec-83b4-e88f7627d862",  ⎫
        "schemaSource": "email2",                          ⎬  172
        "schemaType": "sent",                              ⎪
        "schemaVersion": "1.0"                             ⎭
    },
    "to": {
        "email": "john@xyz.com",
        "firstName": "John",
        "lastName": "Doe",
    },
    "campaignId": "Program Registration",
    "data": {
    "subject": "Join us at our Big Event 2019!"
    }
    "language": "English"
}
```

```
{                                                                    180
    "expctr": {
        "tenant": "0b8a9f00-11fa-44ec-83b4-e88f7627d862",  ⎫
        "schemaSource": "email2",                          ⎬  182
        "schemaType": "sent",                              ⎪
        "schemaVersion": "1.0"                             ⎭
    },
    "to": {
        "email": "john2@xyz.com",
        "firstName": "John",
        "lastName": "Smith",
    },
    "campaignId": "Program Registration",
    "data": {
    "subject": "Join us at our Big Event 2019!"
    }
    "region": "USA"
}
```

FIG. 3C

| Customer name | Solution | Interaction | Date/Time | Device | Marketing Campaigns |
|---|---|---|---|---|---|
| Aaron Adams | CCM | Monthly Statement – July<br>Email: yes<br>Sent: yes<br>Opened: yes<br>Clicks: no | 07.07.19 01:22 | | • 4th of July promo<br>• Go paperless |
| | Website | Login<br>Page: corporate site<br>Success: yes<br>Clicks: 401k rollover promo | 07.06.19 08:52 | Laptop | • 4th of July promo<br>• 401k rollover promo |
| | Call center | Voice call<br>Initiated: customer<br>Sentiment: question<br>Resolution: yes | 07.05.19 18:52 | | • 4th of July promo |
| | Asset Management | Image request<br>Requestor: mobile app<br>Location: 80207 | 07.12.19 15:41 | smartphone | |
| Alice Adams | Website | Login<br>Page: corporate site<br>Success: yes<br>Clicks: none | 07.07.19 01:22 | | • 4th of July promo<br>• Go paperless |
| | Website | Login<br>Page: corporate site<br>Success: yes<br>Clicks: 401k rollover promo | 07.06.19 08:52 | tablet | • 4th of July promo<br>• 401k rollover promo |
| | Call Center | Chat<br>Initiated: customer<br>Sentiment: complaint<br>Resolution: yes | 07.05.19 18:52 | | • 4th of July promo |
| | CCM | Monthly Statement – July<br>Email: yes<br>Sent: yes<br>Opened: yes<br>Clicks: no | 07.07.19 01:22 | | • 4th of July promo<br>• Go paperless |

FIG. 16

ADAPTIVE BIG DATA SERVICE

CROSS-REFERENCE TO RELATED APPLICATION(S)

This application is a continuation of, and claims a benefit of priority under 35 U.S.C. 120 from, U.S. patent application Ser. No. 16/503,186, filed Jul. 3, 2019, entitled "ADAPTIVE BIG DATA SERVICE," issued as U.S. Pat. No. 11,194,813, which claims the benefit of priority under 35 U.S.C. § 119(e) of U.S. Provisional Patent Application No. 62/694,701, entitled "Adaptive Big Data Service," filed Jul. 6, 2018, which are hereby fully incorporated by reference herein.

TECHNICAL FIELD

The present application relates to systems and methods for processing events. More particularly, some embodiments real to a big data analytics service for processing heterogeneous events.

BACKGROUND

Enterprise environments have been steadily growing, encompassing an ever-expanding variety of applications that produce increasingly complex data. An enterprise may wish to employ big data analytics to turn their large sets of data into actionable insights. There are, however, often information gaps between the enterprise's applications, making it difficult to harness insights across application systems. For example, it may be difficult to determine how an email campaign drives website visits if the enterprise's email system and website application use different formats or schema. To bridge these gaps, big data analytics systems are deployed on an enterprise-specific basis, incorporating domain-specific data models and domain specific processing models with upfront dependencies tightly tied to the enterprise's data schema's and the analysis to be performed. Accommodating new data schemas can require extensive reprogramming of the dependencies.

SUMMARY

One embodiment of an event processing system comprises a processor and a non-transitory computer readable medium coupled to the processor. The non-transitory computer readable medium stores computer-readable code executable to provide a domain-agnostic service for analyzing data. The domain-agnostic service can be used to process heterogeneous events conforming to a plurality of schemas. The domain-agnostic service comprises an adaptive data model and an adaptive processing model. The adaptive data model can support runtime event type discovery and event schema management that reacts to new schemas discovered at runtime. The adaptive processing model can support configurable partitioning of events by event type and time and is reactive to create new aggregations and analyses based on the propagation of new partitions.

According to one embodiment, the computer-readable code is executable to: receive a set of heterogeneous events and isolate events in the set of heterogeneous events to collections of homogeneous events based on event types, such that each collection of heterogenous events includes events of a corresponding event type from a plurality of event types. In one embodiment, the computer-readable code can be executable to determine a first event type from a first event, add the first event type to the adaptive data model, start a first collection of homogeneous events for events of the first event type, and write the first event to the first collection of homogeneous events.

The adaptive processing model can be configured to react to a propagation of a first collection of homogeneous events containing events of a first event type to determine a first event schema for the first event type and store the events of the first event type from the first collection of homogeneous events to a first micro-batch according to a first structured format that reflects the first event schema. According to one embodiment, the first event schema describes an event structure and comprises a set of schema attributes. The first structured format of the micro-batch may comprise columns corresponding to the schema attributes.

The adaptive processing model can be configured to determine if the first event schema is part of the adaptive data model and based on a determination that the first event schema is not part of the adaptive data model, determine the first event schema by discovering the first event schema from the events in the first collection of homogeneous events.

The adaptive processing model can be configured to react to a propagation of a second collection of homogeneous events containing events of a second event type to determine a second event schema for the second event type and store the events of the second event type from the second collection of homogeneous events to a second micro-batch, where the second micro-batch uses a second a structured format that reflects the second event schema. The second structured format may be different than the first structured format.

According to one embodiment, the computer-readable code is executable to create a plurality of micro-batches containing events of the first event type, store the plurality of micro-batches in a first data store, select the plurality of micro-batches from the first data store based on the first event type and coalesce the plurality of micro-batches from the first data store into a first partition in a second data store.

The adaptive processing model can be configured to receive an aggregation rule applicable to the first event type and execute the aggregation rule. The aggregation rule can be executed to: select, from the first data store, a first set of events that meet the aggregation rule and select, from the second data store, a second set of events that meet the aggregation rule. The first set of events and second set of events can be written to a first aggregation.

The adaptive processing model can be configured to react to a propagation of a new micro-batch by creating a real-time aggregation of events using events from the new micro-batch and propagating the real-time aggregation of events.

The adaptive processing model can be configured to receive an analysis rule applicable to the first event type and execute the analysis rule. The analysis rule can be executed to apply the analysis rule to the first aggregation to generate an analysis result. Applying the analysis rule to the first aggregation may comprise applying a relational function or a relational transformation to events in the first aggregation.

The adaptive processing model can be configured to react to a propagation of a real-time aggregation of events by applying the analysis rule to the real-time aggregation of events to generate a real-time analysis result.

Another embodiment comprises a computer program product comprising a non-transitory computer readable medium that stores computer-readable code. The computer-readable code can be executable to provide a domain-agnostic service for analyzing data and processing heterogeneous events conforming to a plurality of schemas using the service. The domain-agnostic service comprises an adaptive data model and an adaptive processing model. The adaptive data model supports runtime event type discovery and event schema management that reacts to new schemas discovered at runtime. The adaptive processing model supports configurable partitioning of events by event type and time and is reactive to create new aggregations and analyses based on the propagation of new partitions.

According to one embodiment, the computer-readable code is executable to: receive a set of heterogeneous events and isolate events in the set of heterogeneous events to collections of homogeneous events based on event types, such that each collection of heterogenous events includes events of a corresponding event type from a plurality of event types.

According to one embodiment, the computer-readable code can be executable to determine a first event type from a first event, add the first event type to the adaptive data model, start a first collection of homogeneous events for events of the first event type, and write the first event to the first collection of homogeneous events.

According to one embodiment, the computer-readable code is executable to: react to a propagation of a first collection of homogeneous events containing events of a first event type to determine a first event schema for the first event type and store the events of the first event type from the first collection of homogeneous events to a first micro-batch according to a first structured format that reflects the first event schema. According to one embodiment, the first event schema describes an event structure and comprises a set of schema attributes. The first structured format of the micro-batch may comprise columns corresponding to the schema attributes.

According to one embodiment, the computer-readable code is executable to determine if the first event schema is part of the adaptive data model and based on a determination that the first event schema is not part of the adaptive data model, determine the first event schema by discovering the first event schema from the events in the first collection of homogeneous events.

According to one embodiment, the computer-executable code is executable to react to a propagation of a second collection of homogeneous events containing events of a second event type to determine a second event schema for the second event type and store the events of the second event type from the second collection of homogeneous events to a second micro-batch, where the second micro-batch uses a second a structured format that reflects the second event schema. The second structured format may be different than the first structured format.

According to one embodiment, the computer-readable code is executable to create a plurality of micro-batches containing events of the first event type, store the plurality of micro-batches in a first data store, select the plurality of micro-batches from the first data store based on the first event type and coalesce the plurality of micro-batches from the first data store into a first partition in a second data store.

According to one embodiment, the computer-readable code is executable to receive an aggregation rule applicable to the first event type and execute the aggregation rule. The aggregation rule can be executed to: select, from the first data store, a first set of events that meet the aggregation rule and select, from the second data store, a second set of events that meet the aggregation rule. The first set of events and second set of events can be written to a first aggregation.

According to one embodiment, the computer-readable code is executable to react a propagation of a new micro-batch by creating a real-time aggregation of events using events from the new micro-batch and propagating the real-time aggregation of events.

According to one embodiment, the computer-readable code is executable to receive an analysis rule applicable to the first event type and execute the analysis rule. The analysis rule can be executed to apply the analysis rule to the first aggregation to generate an analysis result. Applying the analysis rule to the first aggregation may comprise applying a relational function or a relational transformation to events in the first aggregation.

According to one embodiment, the computer-readable code is executable to react to a propagation of a real-time aggregation of events by applying the analysis rule to the real-time aggregation of events to generate a real-time analysis result.

Another embodiment comprises a computer-implemented method comprising providing a domain-agnostic service for analyzing data and processing heterogeneous events conforming to a plurality of schemas using the service. The domain-agnostic service comprises an adaptive data model and an adaptive processing model. The adaptive data model supports runtime event type discovery and event schema management that reacts to new schemas discovered at runtime. The adaptive processing model supports configurable partitioning of events by event type and time and is reactive to create new aggregations and analyses based on the propagation of new partitions.

According to one embodiment, the method includes: receiving a set of heterogeneous events and isolating events in the set of heterogeneous events to collections of homogeneous events based on event types, such that each collection of heterogenous events includes events of a corresponding event type from a plurality of event types.

According to one embodiment, the method includes: determining a first event type from a first event, add the first event type to the adaptive data model, starting a first collection of homogeneous events for events of the first event type, and writing the first event to the first collection of homogeneous events.

According to one embodiment, the method includes reacting to a propagation of a first collection of homogeneous events containing events of a first event type. Reacting the propagation of the first collection of homogenous events may include determining a first event schema for the first event type and storing the events of the first event type from the first collection of homogeneous events to a first micro-batch according to a first structured format that reflects the first event schema. According to one embodiment, the first event schema describes an event structure and comprises a set of schema attributes. The first structured format of the micro-batch may comprise columns corresponding to the schema attributes.

According to one embodiment, the method includes determining if the first event schema is part of the adaptive data model and based on a determination that the first event schema is not part of the adaptive data model, determining the first event schema by discovering the first event schema from the events in the first collection of homogeneous events.

According to one embodiment, the method includes reacting to a propagation of a second collection of homogeneous events containing events of a second event type. Reacting to the propagation of the second collection of homogeneous events may include determining a second event schema for the second event type and storing the events of the second event type from the second collection of homogeneous events to a second micro-batch. The second micro-batch may use a second a structured format that reflects the second event schema. The second structured format may be different than the first structured format.

According to one embodiment, the method includes creating a plurality of micro-batches containing events of the first event type, storing the plurality of micro-batches in a first data store, selecting the plurality of micro-batches from the first data store based on the first event type and coalescing the plurality of micro-batches from the first data store into a first partition in a second data store.

According to one embodiment, the method includes receiving an aggregation rule applicable to the first event type and executing the aggregation rule. The aggregation rule can be executed to select, from the first data store, a first set of events that meet the aggregation rule and select, from the second data store, a second set of events that meet the aggregation rule. The first set of events and second set of events can be written to a first aggregation.

According to one embodiment, method includes reacting a propagation of a new micro-batch by creating a real-time aggregation of events using events from the new micro-batch and propagating the real-time aggregation of events.

According to one embodiment, the method includes receiving an analysis rule applicable to the first event type and executing the analysis rule. The analysis rule can be executed to apply the analysis rule to the first aggregation to generate an analysis result. Applying the analysis rule to the first aggregation may comprise applying a relational function or a relational transformation to events in the first aggregation.

According to one embodiment, method includes reacting to a propagation of a real-time aggregation of events by applying the analysis rule to the real-time aggregation of events to generate a real-time analysis result.

BRIEF DESCRIPTION OF THE DRAWINGS

The drawings accompanying and forming part of this specification are included to depict certain aspects of the disclosure. It should be noted that the features illustrated in the drawings are not necessarily drawn to scale. A more complete understanding of the disclosure and the advantages thereof may be acquired by referring to the following description, taken in conjunction with the accompanying drawings in which like reference numbers indicate like features and wherein:

FIG. 2A illustrates one embodiment of a user object.

FIG. 2B illustrates one embodiment of a GeoIP object.

FIG. 3A illustrates one embodiment of a first event and event schema.

FIG. 3B illustrates one embodiment of a second event and event schema.

FIG. 3C illustrates one embodiment of a third event and fourth event.

FIG. 16 is a diagrammatic representation of one embodiment of a customer interaction database.

DETAILED DESCRIPTION

Embodiments and the various features and advantageous details thereof are explained more fully with reference to the non-limiting embodiments that are illustrated in the accompanying drawings and detailed in the following description. Descriptions of well-known starting materials, processing techniques, components and equipment are omitted so as not to unnecessarily obscure the embodiments in detail. It should be understood, however, that the detailed description and the specific examples are given by way of illustration only and not by way of limitation. Various substitutions, modifications, additions and/or rearrangements within the spirit and/or scope of the underlying inventive concept will become apparent to those skilled in the art from this disclosure.

In accordance with various embodiments, event processing systems and methods are provided. An event processing system may implement an adaptive service that is domain-agnostic and does not require predefined event schemas and analysis rules. The adaptive service may employ an adaptive data model and an adaptive processing model. The adaptive data model supports runtime event type discovery and reactive event schema management. The adaptive processing model supports configurable event-type/time partitioning. The adaptive processing model may further support declarative/composable aggregations and analysis. The adaptive processing model can provide a scalable, multitenant pipeline that integrates batched events and real time events.

Embodiments of an event processing system can provide an omni-channel view of customer (or other user) interactions. Customer interaction may be tracked across a variety of integrations including, but not limited to, email, web, mobile and call center to surface pending actions with respect to the customer. Embodiments of an event processing system can provide deeper insights into customer interactions across integrations, allowing an enterprise to track the progress of various campaigns in real-time. For example, the event processing system can provide a view of customer interactions related to an email marketing campaign, from sending the email to the customer, to the customer opening the email, the visiting a website landing page and clicking on links.

The event processing system can capture a wide variety of data from a vast number of integrations. Examples of data that can be captured from integrations include, but are not limited to, customer interactions (e.g., visits to website, calls to contact center, view of all communications sent to the customer), customer data (e.g., customer preferences, geo location, segmentation), solution data (e.g., number of communications created, number of webpage errors, solution performance and spikes).

Figure 1:
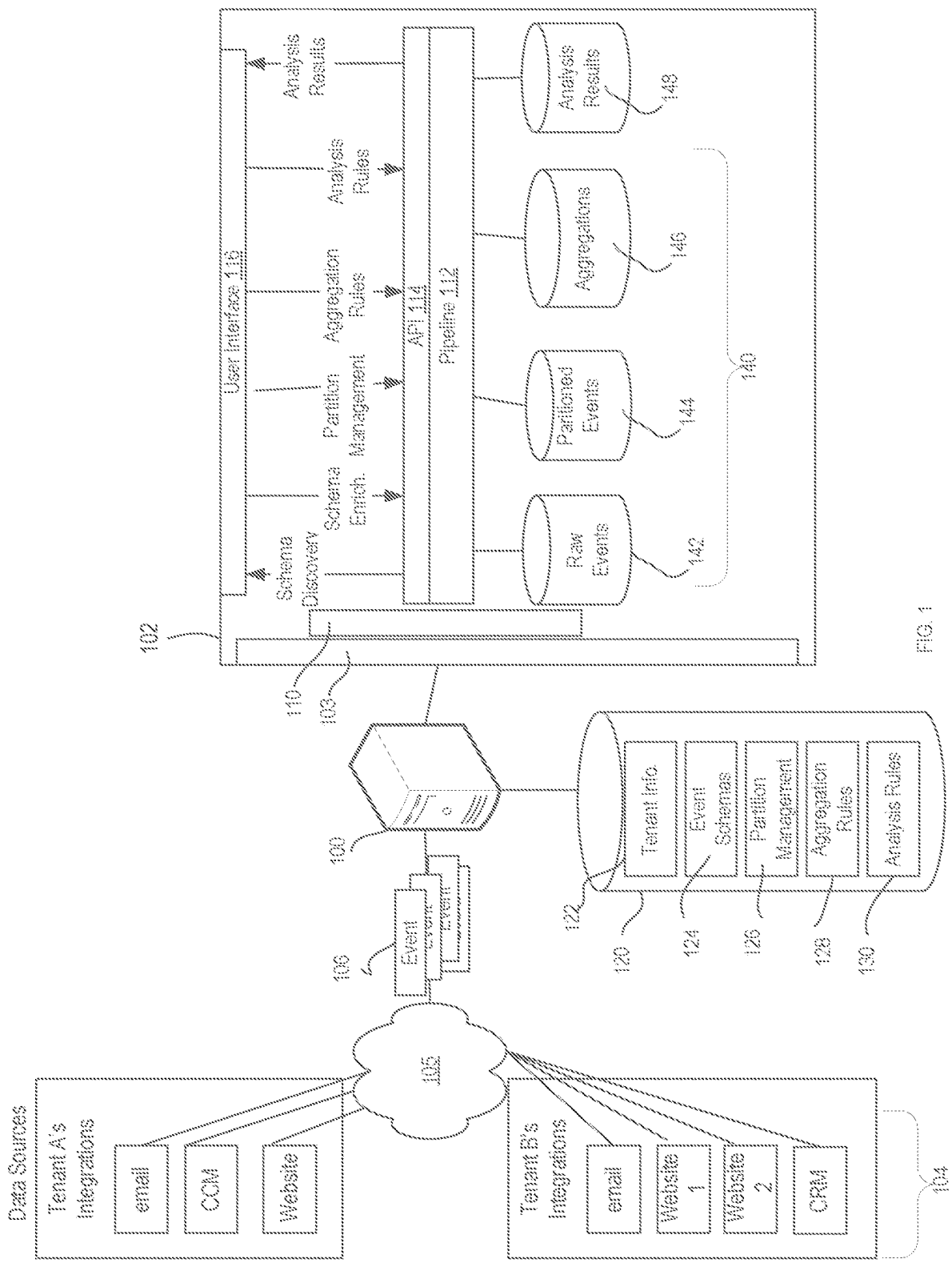
FIG. 1 is a diagrammatic representation of one embodiment of an architecture for big data analytics.

To those ends, among others, attention is now directed to the FIG. 1, which depicts one embodiment of an architecture for big data analytics. Here, an event processing system 100 is coupled by a network 105 to tenant data sources 104, which may be controlled by any number of tenants and include a variety of integrations (applications) configured to provide data to event processing system 100. Event processing system 100 provides an adaptive big data service (ABDS) 102 having an event interface 103 via which data sources can provide data to ABDS 102. Event interface 103 may be REpresentational State Transfer (REST) interface or other type of interface.

The data received from various data sources 104 may be modelled as events 106. Each event 106 is a unit of data that describes an action that occurs at a moment in time. Some non-limiting examples of actions that may be described by events include an email server sending an email to a user, a user vising a website, a user clicking on a link, a customer communication management system (CCM) sending a bill. An event 106 logically represents the action for reasoning about the behavior of a system and may comprise multiple pieces of information that represent a single action. For example, an event 106 may describe the who/what/when of an action. The information or data elements contained within an event is referred to as event metadata herein.

Events conform to event schemas that define the syntax and semantics of the events. An event schema defines what information an event may (or must) contain and "how" that information is represented. The "what" and "how" define the semantic and syntactic aspects, respectively. An event schema can specify, for example, event metadata field names, the event metadata field data types and event metadata field nullability classifications (e.g., whether each field is required (non-nullable) and optional (nullable)). An event schema may also describe relationships between event metadata fields (e.g., nesting and scoping) and other aspects of an event's structure. Given an event schema, a system may determine whether a particular event complies with that event schema. Conversely, an event schema may be used to compose a compliant event. Events of an event type conform to the same schema.

Each tenant (e.g., Tenant A, Tenant B) may implement their own application event model where an application event model refers to all the event types and their schemas for the tenant's integrations. For example, a tenant's application event model may refer to all the schema sources, schema types and schema versions within those schema sources, and all the type-specific event metadata fields within those schema types and schema versions, including the type-specific event metadata field names, representations and nullability classifier (e.g., nullable, non-nullable). ABDS 102 does not require that a formal definition of a tenant's application event model exist or that a tenant's application event model is complete or unchanging.

ABDS 102 may be used across arbitrary application domains having substantially different application event models. As such, relatively little commonality may exist between the application event models and, hence, the events received across domains. ABDS 102, however, does not require that the application event models be prescribed at or by ABDS 102. Instead, ABDS 102 can discover application event models at runtime.

To accommodate this flexibility, ABDS 102 may use an open reference event model that defines a limited set of common event metadata. This limited set of common event metadata may be generic, common metadata applicable to any potential domain. The reference event model may define, for example, a set of common metadata that is required (non-nullable fields) and recommended common metadata (nullable fields). Beyond the limited set of common event metadata, the domain-specific aspects of the event schemas may remain unconstrained.

According to one embodiment, events include a tuple to indicate the event type, where the tuple comprises a collection of data elements (e.g., a collection metadata fields) that is used to indicate event type. The values of the tuple event metadata fields in an event form a tuple identity for the event, where the tuple identity may be considered to be an event type.

The tuple may comprise any set of event metadata fields that can be used to differentiate events by event type. One embodiment of a tuple definition is illustrated in Table 1 below:

TABLE 1

| Name | DataType | Nullable |
| --- | --- | --- |
| tenant | String (uuid) | False |
| schemaSource | String | False |
| schemaType | String | False |
| schemaVersion | String | False |

The "tenant" event metadata field of an event holds a tenant id (e.g., a universally unique identifier (uuid)) that identifies a tenant of ABDS 102. The tenant id can be used to associate events originating from any applications (integrations) that belong to that tenant. When data source 104 submits an event 106, the tenant associated with the data source 104 is determined (e.g., based on authentication information, session information, directory service information or other information) and the tenant id for the tenant populated. The tenant id can be used to segregate schema sources, schema types and schema versions by tenant.

The "schemaSource" event metadata field of an event holds a user-defined (e.g., tenant-defined) name for a logically distinct source of events. The tenant may define one or more event sources, where each schema source may designate different functional components within a tenant's application domain. For example, the user may define "email" as a first schema source and "website" as a second schema source, where "email" and "website" refer to logically distinct sources of events. In a domain having multiple functional components, multiple components could be grouped as a single source or as multiple sources. In a domain having multiple websites, for instance, a tenant could define a single source, such as "website", that designates the websites collectively or define different source names for each website.

The "schemaType" event metadata field of an event holds a user-defined (e.g., tenant-defined) type for a distinct event schema within a given schemaSource. The user may define one or more schema types for each source. Different schema types to designate different actions related to that source. For example, the user may define a "sent" schema type and "receive" schema type for an "email" source and a "pagevisit" type for a "website" source.

The "schemaVersion" event metadata field of an event can hold a user-defined (e.g., tenant-defined) schema version used to identify potential variations of a schema type, where different versions of a schema type may have different event schema. The version may be used to evolve a given schema type over time should need arise to change an event schema, such as adding, removing or renaming fields. If an event does not have a schema version designated, ABDS 102 can infer a version, insert a default version (or leave the version null).

Together, the values for tenant, schemaSource, schemaType and schemaVersion in an event form the tuple identity of the event. As will be appreciated, the tuple of Table 1 is provided by way of example and not limitation. Various implementations may use other metadata fields to designate an event type, including a single metadata fields (e.g., an "event type" fields) or combinations of metadata fields.

The reference event model may also define recommended common metadata (nullable fields). For example, the reference event model may specify a "user" object that groups metadata for an end user associated with an event (for example, data for a tenant's customer), when applicable, and a nested GeoIP object that groups metadata related to the location of an end-user. The user object can facilitate pre-defined/out-of-the-box end-user analyses including label assignment and GDPR tracking. For a given event type—that is for a given event schema—an event instance associated with an identifiable end-user may include the user object and GeoIP object.

In one embodiment, a user object is illustrated in FIG. 2A. In the embodiment of FIG. 2A, the user id is a string containing an identifier for the end user as defined by the tenant's application. ABDS 102 may use this field for end-user analysis but does not specify how it is determined. For example, an event may include an end user's login name, email address, or any other value that uniquely identifies the end user. If null, the event is considered anonymous. FIG. 2A also illustrates other examples of attributes for one embodiment of a "user" object. FIG. 2B illustrates one embodiment of a GeoIP object. Event schema portions for objects defined in the open reference event model may be predefined at ABDS 102.

Returning to FIG. 1, an event 106 may thus include common event meta fields—that is a set of metadata fields required or recommended for all events 106, regardless of event type, by the reference event model. An event 106 may also include type-specific event metadata. In this context, type-specific metadata refers to the subset of data elements that belong to a given event type. The type-specific event metadata may be the set of metadata in an event schema that is not common event metadata. In some cases, multiple event types may have overlapping type-specific metadata, depending on the tenant's application event model. Events 106 may be provided in a format in which the event metadata fields are easily extractable. By way of example, but not limitation, events may be provided as XML data, JSON objects or according to other formats.

When ABDS 102 receives an event, ABDS 102 may infer a portion of the event metadata and add the inferred metadata to the events 106. For example, ABDS 102 may infer a tenant id and add the appropriate tenant id to each event 106. ABDS 102 adds events 106 to an event hub 110 from which the events can be ingested by a pipeline 112 for processing. ABDS 102 may include many instances of pipeline 112 (or portions of pipeline) at the same time to provide a highly concurrent event processing system.

Pipeline 112 can ingest heterogeneous events modelling actions a wide variety of data sources 104 controlled by any number of tenant's and implement tenant-specific processing. To this end, event processing system 100 may include, or access a system data store 120 used for data storage and data management where there is a various data defined or otherwise configured for each tenant. In the embodiment illustrated, system data store 120 stores tenant information 122, such as information about tenant data sources, unique tenant ids and other information about tenants. Data store 120 may also store event schemas 124 for various event types, partition management configuration 126, aggregation rules 128 and analysis rules 130 for use by pipeline 112. The event schemas 124 for various event types, partition management configuration 126, aggregation rules 128 and analysis rules 130 may be segregated by tenant. A user-facing interface 114 provides an interface (e.g., API or other interface) through which a user interacting with a user interface (UI) 116 can declare or enrich schemas 124, provide partition management configuration 126, define aggregation rules 128 and define analysis rules 130 for use by pipeline 112.

An event schema 124 for an event type includes a description of the structure of data in events of the event type. An event schema 124 can comprise a collection of schema fields (schema attributes) that represent the event metadata fields or the event type. A schema field object may include a name, data type and nullability classification. ABDS 102 may learn the event schema 124 for an event type (e.g., tuple identity) in a number of ways. In some instances, a user (e.g., tenant) may declare the event schema 124 for an event type using UI 116. In addition, or in the alternative, ABDS 102 may discover or infer the event schemas 124 for an event type. For example, an event schema 124 for an event type may be inferred from the data elements in events of the event type.

According to one embodiment, ABDS 102 may implement various schema discovery rules to discover the event schema for an event type. Schema discovery infers, for an event type, the event metadata fields (names, data types, nullability) that are present in the event schema for the event type. It may be possible to infer an event schema from a single event of an event type. However, in some cases, a particular event 106 of an event type may omit fields or attribute values for which that event does not have a value. Analyzing a larger collection of homogeneous events can allow pipeline 112 to union event metadata fields across multiple events of an event type to more accurately determine the event schema for the event type. Pipeline 112 may parse the events in a collection of homogenous events to identify the unique event metadata fields across multiple events and union those unique attributes to determine the schema. In some embodiments, the schema preserves the relationship between attributes.

Using the example of a JSON event, ABDS 102 may extract JSON data names from the JSON event as schema attribute names (field names). According to one embodiment, schema attribute names may be treated as case-preserving but not case-sensitive. This means that if an event contains the data name "My Field Name", ABDS 102 preserves that name as the attribute name in the schema, using upper and lower case letters as transmitted in the event. If different events of the same event type vary the case for the attribute name, the first occurrence takes precedence. For example, three events of the same event type may be received in chronological order that respectively include the data names "My Field Name," "my field name," "MY FIELD NAME" and these may be considered instances of the same attribute "My Field Name." In other embodiments, data names that have different cases may be considered to be the names of different schema attributes.

As will be appreciated, event metadata fields may be nested in a JSON Object or array. For example, a speed field may be nested in a wind field nested in a weather field. According to one embodiment, nesting may be preserved. For example, the attribute name weather.wind.speed may be used to preserve the nesting of the speed field. Nesting in JSON can provide scoping, which allows the same metadata field to be used in different objects. Again, such scoping may be preserved. For example, if both an "apple" attribute and a "sky" attribute include a nested "color" attribute, the attributes may be preserved as schema attributes apple.color and sky.color. The example of namespacing employing the period (".") separator is arbitrary. Other namespacing schemes may be used.

JSON defines a limited number of native data types including the primitives String, Number, Boolean, and null. JSON also supports composition of fields into arrays and objects. Events may contain all of these, and schema discovery can automatically detect the data types based on JSON syntax. In addition to data types supported by an underlying format, such as JSON, schema discovery may infer other data types. For example, schema discovery may support specification of dates and timestamps as specially formatted JSON strings based on industry standards, such as ISO 8601. In this example, ABDS 102 may analyze the attributes values in an event to determine if the attribute value adheres to an industry standard and, if so, designate the data type for the attribute in the schema as date. While JSON is used as the primary example in the foregoing, it will be appreciated that attributes and data types may be discovered from other formats, such as, but not limited to XML.

Figure 3D:
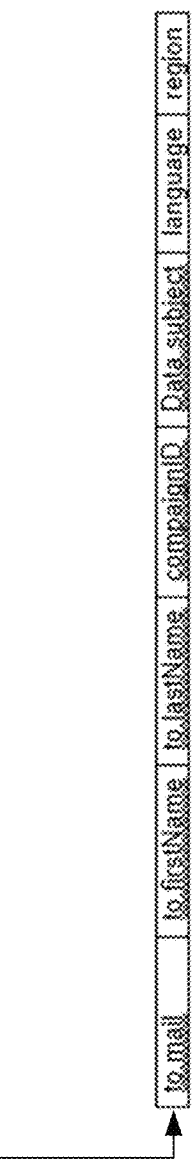
FIG. 3D illustrates one embodiment of an event schema.

To provide additional context, FIG. 3A illustrates one embodiment a first event 150 conforming to a first schema 158, FIG. 3B illustrates an embodiment of a second event 160 conforming to a second schema 168, FIG. 3C illustrates one embodiment of a third event 170 and a fourth event 180 conforming to a third schema and FIG. 3D illustrates one embodiment the third schema 188. While event schemas 158, 168, 188 are depicted as listing of schema attributes (attribute names with associated data types and requirements) for the sake of simplicity, it should be understood that event schemas may be arbitrarily complex and stored according to a variety formats. By way of example, but not limitation, schemas may be stored as SQL schemas.

Events 150, 160, 170, 180 are in JSON format and may be examples of events 106. For the sake of example, events 150, 160, 170, 180 may conform to an example reference event model that defines an "expctr" object comprising the tuple of Table 1, the user object of FIG. 2A and the GeoIP object of FIG. 2B. Each event further conforms to an arbitrarily defined application event model.

Based on the example reference event model, each event includes an event tuple: event 150 includes event tuple 152, event 160 includes event tuple 162, event 170 includes event tuple 172 and event 180 includes event tuple 182. As can be seen, event 150 has a first event tuple identity, event 160 has a second event tuple identity and events 170 and 180 have a third event tuple identity. Thus, event 150 is considered to be of first event type, event 160 is considered to be of a second event type, and events 170 and 180 are considered to be of a third event type.

During schema discovery, ABDS 102 can discover the event schema for each event type. As an initial matter, it can be assumed that each event schema has a set of common schema attributes representing the required set of common event metadata defined by the reference event model. event tuple. Thus, event schema 158, second event schema 168 and third event schema 188 may include a common set of schema attributes representing the event tuple. Further, metadata fields may be compared to optional objects defined in the reference event model. When processing event 150, ABDS 102 may compare event metadata fields 154 in event 150 to optional objects defined in the reference event model and infer that event 150 includes the user object. Thus, ABDS 102 may include schema attributes for the user object and geoIP object in event schema 158. Similarly, ABDS 102 may infer that event 160 includes a user object and add the schema attributes for the user object and geoIP object to event schema 168.

Further ABDS 102 determines type-specific metadata fields to be included in the schemas. For example, ABDS 102 may parse the type-specific metadata fields 156 from event 150 to determine that event 150 includes a "campaign ID" string and a "data" object, containing a "subject" string. ABDS 102 may add the event metadata fields to schema 158 as schema attributes and infer the datatypes for the attributes. Similarly, ABDS 102 can determine that the second schema (e.g., the schema to which event 160 conforms) includes the field "URL" of the "datatype" string and a "datetime" field conforming to the ISO 8601 standard. ABDS 102 adds the appropriate schema attributes to schema 168.

While events 170 and 180 may be considered instances of the same event type, this does not mean that the events necessarily contain all the same data elements. To wit, event 170 does not include a "region" event metadata field and event 180 does not include a "language" event metadata field. Events 170 and 180 thus represent a case where analyzing a single event of an event type may result in an incomplete event schema. In schema discovery, ABDS 102 can determine the set of type-specific metadata fields in event 170 as {to.email, to.firstName, to.LastName, campaignID, data.subject, language} and the set of type-specific metadata fields in event 180 as {to.email, to.firstName, to.LastName, campaignID, data.subject, region} and union the sets to determine the set of type-specific metadata as {to.email, to.firstName, to.LastName, campaignID, data.subject, language, region} as illustrated in FIG. 3D.

Returning to FIG. 1, an event schema discovered for an event type may be stored as an event schema 124) in association with the event type (e.g., tuple identity) for which it was discovered. A schema discovered for an event type through schema discovery may be referred to herein as the physical schema. The physical schema for an event type may be cached and re-evaluated periodically for change (evolution) detection.

A physical schema may be enriched to create a logical schema. According to one embodiment, an event schema 124 may be presented to a user in UI 116 for schema enrichment. UI 116 can provide tools for renaming fields (attributes) to user friendly names, field suppression or redaction, designating whether certain attributes contain personally identifiable information (e.g., for GDPR purposes) or performing other enrichments. UI 116 may also provide tools to allow the user to declare mappings between physical or logical schemas. For example, if a first version of a schema for a schema source/schema type uses the attribute "email" and a second version of the schema uses the attribute "contact" to hold the same type of information (e.g., customer email address), the user may create a mapping from "email" and "contact" to a common field name (such as "email address") so that queries on "email address" search the "email" attribute values of events according to the first version of the schema and "contact" attribute values of events according to the second version of the schema. The logical schema may include referential integrity for subsequent rule expressions upon physical schema evolution. Logical and physical schemas can be merged, with the logical schema serving as a user presentation layer and physical schema serving as a data access layer. Thus, an event schema 124 for an event type may comprise a physical schema and a logical schema for the event type.

Turning to other data in system data store 120, partition management configuration 126 may specify a partitioning time period for time-based partitioning of events. In some embodiments, a partition management configuration 126 may specify partitioning time periods on a per-event type basis. A partition management configuration 126 may also specify retention policies for event collections, micro-batches, or other set of events.

Aggregation rules 128 are defined in the form of relational predicates over the logical event schema. An aggregation rule 128 may be configured to aggregate events based on event type, event metadata fields or other criteria. An aggregation rule 128 may define a fixed aggregation (an aggregation using previously batched data) or a dynamic aggregation (an aggregation that incorporates new events in real time). An aggregation rule 128 may also refer to a retention policy to be applied to a resulting aggregation 146.

Analysis rules 130 may be defined in the form of relational predicates over aggregations 146 with projected fields. An analysis rule 130 may define a fixed analysis (an aggregation using only previously stored events) or a dynamic analysis rule (an analysis that incorporates new events in real time). An analysis rule 130 may also refer to a retention policy to be applied to analysis result 148.

As pipeline 112 processes events 106, pipeline 112 stores events at various stages of processing in event storage 140. For example, pipeline 112 may store the raw events 142, partitioned events 144 and aggregations 146. Event storage 140 may comprise multiple storage tiers with recent events stored in relatively fast storage and older events stored in slower storage (faster and slower refer to the relative speed at which pipeline 112 can read/write from/to the storage tier). By way of example, but not limitation, the storage tiers may include local storage devices of various speeds (e.g., solid state drives, magnetic hard drives), network attached storage, various storage tiers offered by cloud storage providers or other storage tiers. The storage tiers can be selected to allow processing by pipeline 112 to incorporate both events being received in real time and batches of previous events. Pipeline 112 may also store analysis results 148 in a data store.

Pipeline 112 utilizes an adaptive data model and an adaptive processing model. The adaptive data model may comprise the event types and their schemas known to ABDS 102 and adapts to new events and schema types as they are discovered. The adaptive data model may also support reactive schema management to allow event schemas discovered in runtime to be used for partitioning events. The adaptive processing model supports configurable event-type/time partitioning that can incorporate new schema as they are discovered. The adaptive processing model may further support declarative/composable aggregations and analysis.

In operation, pipeline 112 ingests heterogeneous events—that is events conforming to different event schemas—from event hub 110 and processes the events. According to various embodiments, pipeline 112 may be configured to handle events from disparate data sources 104, maintain events 106 in a durable fashion maintain where events 106 came from, maintain fidelity of events 106 (e.g., maintain properties of events in a manner that does not intermix of attributes from different event type), allow users to select data for analysis in a precise way, and support concurrency of batch data and real time data.

Pipeline 112 implements event type discovery to discover new event types associated with tenants and schema isolation to segregate events by event type (e.g., by tuple identity) into collections of homogeneous events—that is, into collections of events having the same event type and thus conforming to the same event schema. Events of an event type are collected into event collections based on event type and a partitioning time period specified in partition management configuration 126. Using collections of homogenous events facilitates the use of set-wise operations that are more scalable and efficient. Events of the same event type—for example, events with the same tuple identity—conform to the same event schema and are related by logical structure. Consequently, events of the same event type can be stored and processed in a relational, set-wise manner.

Pipeline 112 partitions events into micro-batches to produce partitioned events 142. According to one embodiment, each micro-batch contains events of a particular event type collected in a corresponding time slot. A micro-batch of events is stored in a micro-batch data storage structure having a structured format that reflects the event schema for the event type. According to some embodiments, pipeline 112 stores micro-batches according to a columnar data storage format—that is a data storage format that that stores (e.g., serializes) data by column rather than rows—though other formats may be used.

The event schema 124 for an event type may be used to create the data storage structure for storing a micro-batch. More particularly, pipeline 112 can use an event schema 124 for an event type to create a table for storing a micro-batch, with the table having columns that correspond to schema fields in the event schema 124 for the event type. For example, the event schema 188 (FIG. 3D) can be used to create a subset of the columns illustrated in FIG. 4.

The micro-batch data storage structure may include various columns for event metadata. For example, the micro-batch data storage structure may include a column for tenant, a column for schema source, a column for schema type, a column for schema version. The micro-batch data storage structure also includes columns for storing type-specific metadata. The column names may preserve event metadata nesting and scoping as described by the schema.

Figure 4:
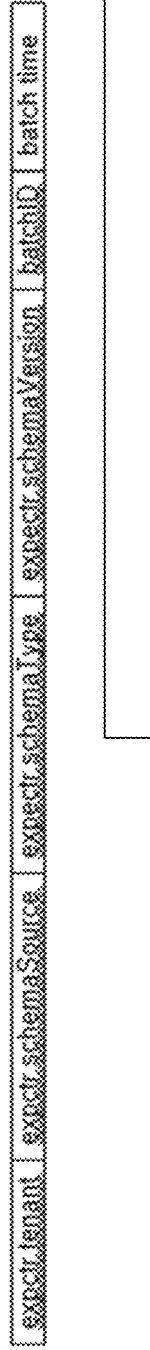
FIG. 4 illustrates one embodiment of a set of columns.

The micro-batch data storage structure may also include columns to support various system functionality or housekeeping. For example, FIG. 4 illustrates that a micro-batch data storage structure may include a column for micro-batch time and a column for micro-batch id. The micro-batch time indicates a time at which a collection events written to a micro-batch was received or collected. The micro-batch id may be assigned by ABDS 102 and used to disambiguate events from event collections received at the same time. Micro-batches for an event type (event tuple) may be coalesced into larger partitions.

Pipeline 112 may further coalesce multiple micro-batches for an event type into a larger partition for that event type. According to one embodiment, the partition into which a set of micro-batches is coalesced may use the same structure format as the micro-batches. For example, a set of micro-batches stored using the columns of FIG. 4 may be coalesced into a partition that also uses the columns of FIG. 4.

Pipeline 112 applies aggregation rules 128 to partitioned events 144 (micro-batches or coalesced micro-batches) to produce aggregations 146. According to one embodiment, pipeline 112 produces an aggregation 146 as a relational result of an aggregation rule 128 as a materialized subset of events. An aggregation 146 can preserve the event schema for relational composition. Pipeline 112 may apply an aggregation rule 128 to produce a fixed aggregation 146 that incorporates only events that were already batched or to create a dynamic aggregation 146 that it automatically updates a resulting aggregation as new events are processed.

Pipeline 112 applies analysis rules 130 to aggregations 146 to produce analysis results 148. According to one embodiment, pipeline 112 produces a materialized subset of projected fields. Pipeline 112 may apply an analysis rule 130 to produce a fixed analysis result 148 that incorporates only batch events or to create a dynamic analysis result 148 that it automatically updates as new events are processed. Analysis results 148 may provide a basis for reporting.

Figure 5A:
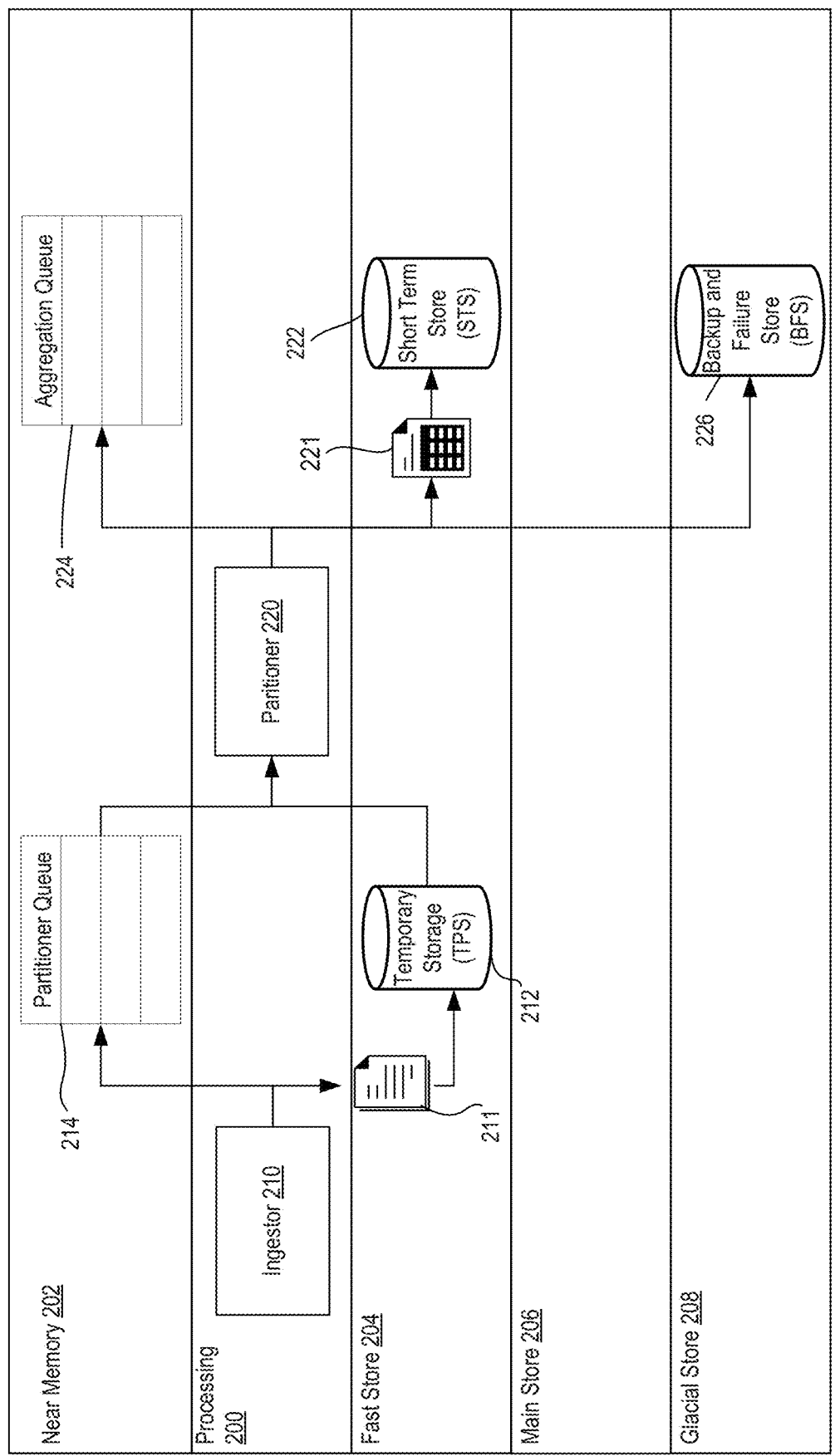
FIG. 5A illustrates a first portion of one embodiment of a pipeline architecture.
Figure 5B:
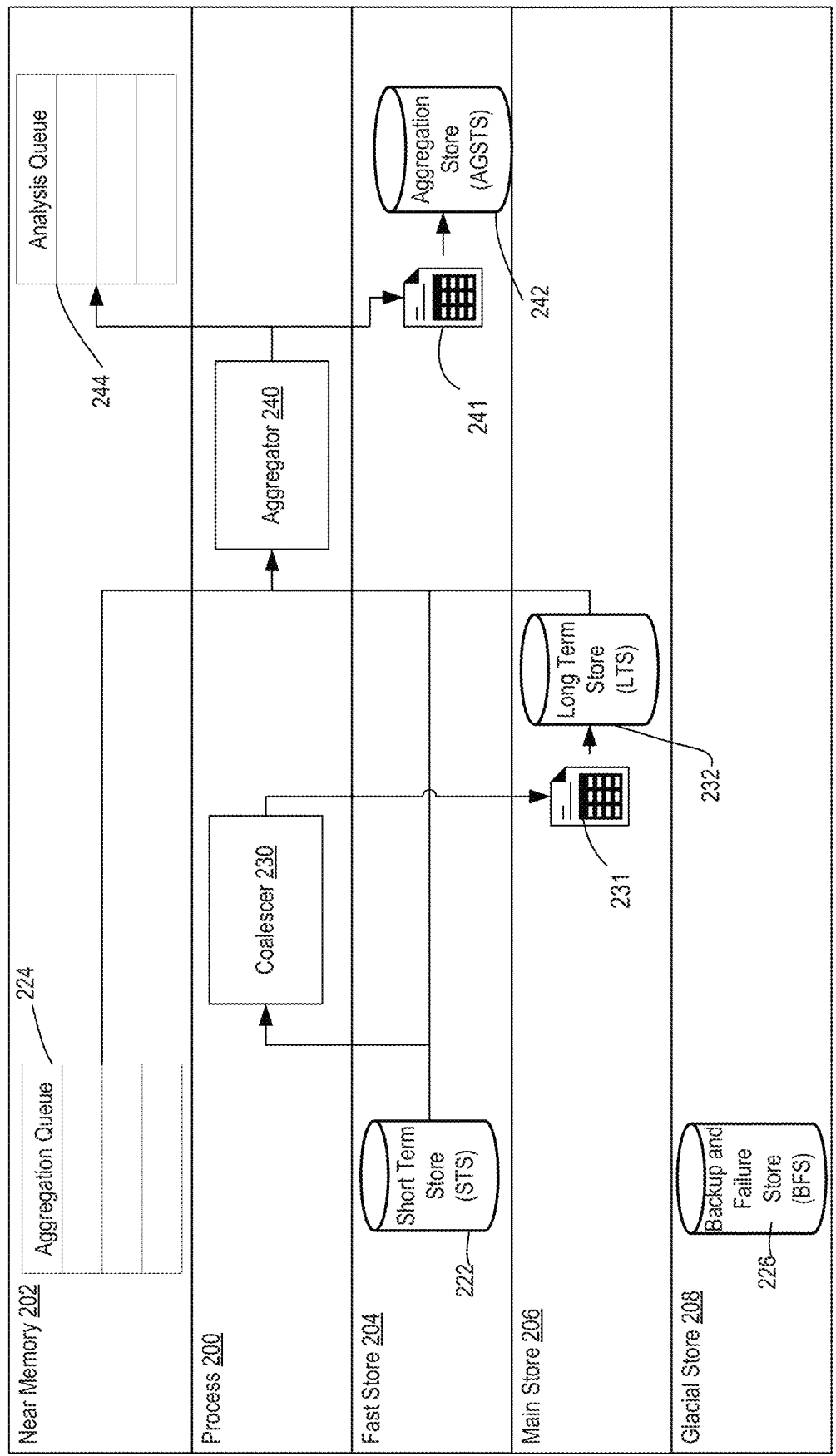
FIG. 5B illustrates a second portion of one embodiment of a pipeline architecture.
Figure 5C:
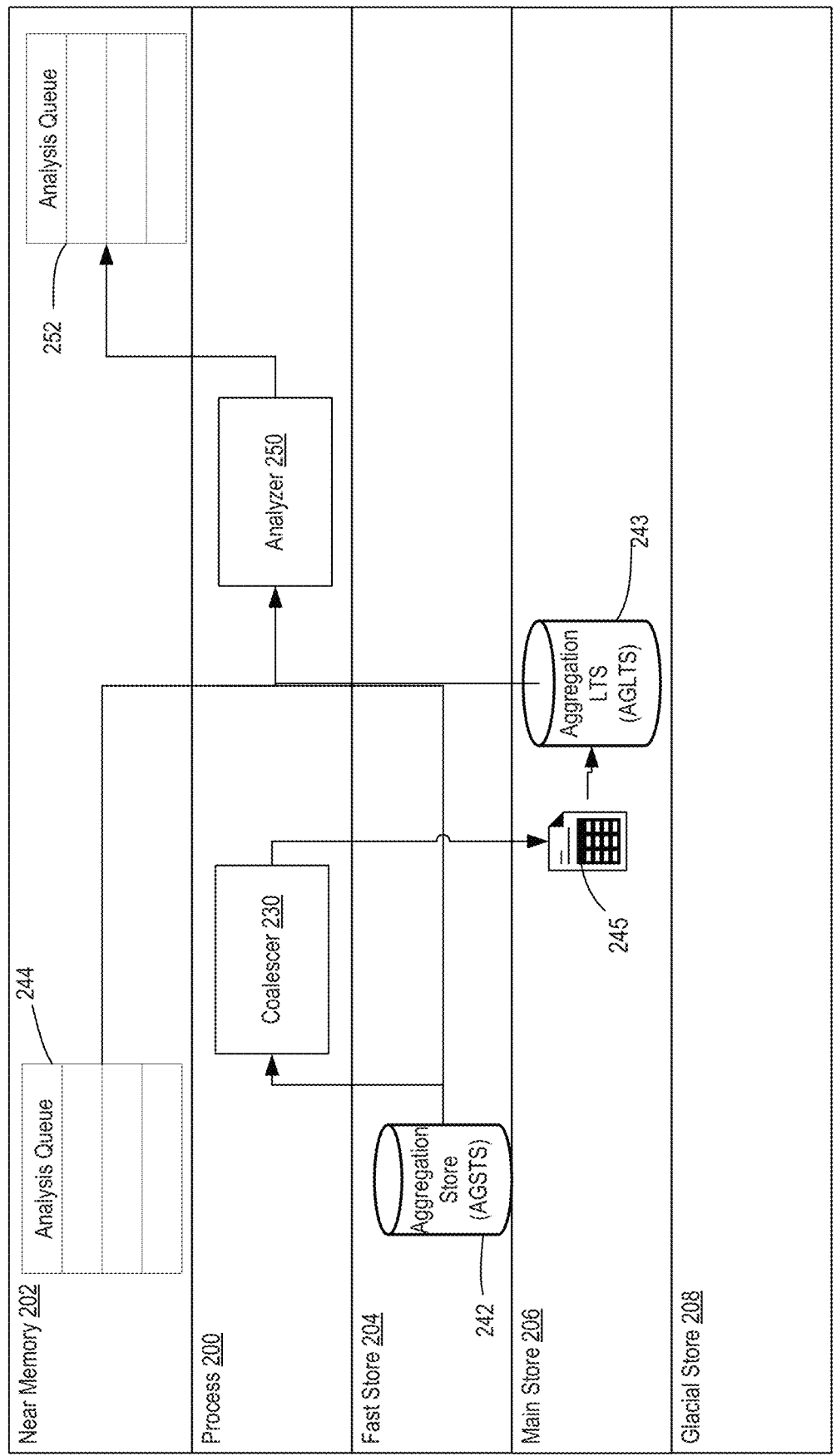
FIG. 5C illustrates a third portion of one embodiment of a pipeline architecture.

FIG. 5A, FIG. 5B and FIG. 5C are diagrammatic representations of one embodiment of a pipeline architecture implementing one embodiment of an ABDS pipeline. The pipeline architecture includes a processing layer 200, near memory 202, and tiered storage, the tiered storage including fast store 204, main store 206 and glacial store 208.

The pipeline architecture of FIGS. 5A, 5B and 5C utilizes computer readable memories and storage that have a range of data access speeds, with near memory 202 providing the fastest access, then fast store 204, then main store 206, then glacial store 208. According to one embodiment, near memory 202 comprises volatile memory, such as RAM or processor cache memory, fast store 204 comprises local drives (solid state, hard drives), main store 206 comprises network attached storage or cloud data storage, and glacial store 208 comprises relatively slow archival storage. In another embodiment, fast store 204, main store 206 or glacial store 208 may represent different storage tiers offered by a cloud storage provider.

Main store 206 may store data using a relatively large block sizes, for example 64 MB, 128 MB or other block size. This means that a single block can store a relatively large number of events. As will be appreciated, using a large block size can make relational operations over events extremely efficient as fewer blocks have to be read to obtain a full set of events meeting a query. While the use of a large block sizes can provide advantages for aggregating and analyzing batches of previously stored events, a large block size has disadvantages for incorporating real-time data. In particular, writing new events to main store 206 too quickly can result in writing blocks that are partially, if not mostly, empty, leading to inefficient use of storage space and increasing the number of blocks that must be read from main store 206 for aggregation or analysis. On the other hand, waiting until a block size set of events have been received before writing a block to main store 206 can result in significant delay before the events are available in main store 206 for aggregation and analysis. Embodiments of the pipeline architecture may implement various techniques to balance speed, cost and storage efficiency while providing aggregation and analysis that can incorporate both batch and real-time events.

Various stores are implemented using fast store 204, main store 206 and glacial store 208, including, but not limited to, temporary store (TPS) 212, short-term store (STS) 222, long-term store (LTS) 232, aggregator short-term store (AGSTS) 242, aggregator long-term store (AGLTS) 243 and backup and failure store (BFS) 226. Each of TPS 212, STS 222, LTS 232, AGSTS 242, AGLTS 243, BFS 226 may include various types of storage including, for example, a file system or database. In some embodiments, each of TPS 212, STS 222, LTS 232, AGSTS 242, AGLTS 243, BFS 226 may be quired using SQL or other query language.

Processing layer 200 executes the functional components of the pipeline. In the embodiment of the FIGS. 5A, 5B and 5C, the pipeline includes an ingestor 210, partitioner 220, coalescer 230, aggregator 240 and analyzer 250. In some embodiments, ingestor 210, partitioner 220, coalescer 230, aggregator 240 and analyzer 250 may be portions of the same process (for example threads of a process). In other embodiments, any combination of ingestor 210, partitioner 220, coalescer 230, aggregator 240 and analyzer 250 may run as portions of a first process and the remaining components as portions of one or more other processes. In yet other embodiments, each of ingestor 210, partitioner 220, coalescer 230, aggregator 240 and analyzer 250 (potentially distributed across a network) runs in a separate process. Processing of processing layer 200 may be distributed across one or more processors on one or more computers. For example, each of ingestor 210, partitioner 220, coalescer 230, aggregator 240 and analyzer 250 may run on a different processor, including processors on different computers. Each of ingestor 210, partitioner 220, coalescer 230, aggregator 240 and analyzer 250 may include an interface (e.g., a REST interface) to allow communications between the pipeline components. While only one instance of each of ingestor 210, partitioner 220, coalescer 230, aggregator 240 and analyzer 250 is illustrated, processing layer 200 may include multiple instances of each.

The pipeline architecture can implement an adaptive data model that supports runtime event type discovery and reactive event schema management. The pipeline architecture can also implement an adaptive processing model that supports configurable event-type/time partitioning. The adaptive processing model may further support declarative/composable aggregations and analysis.

Ingestor 210 performs event type (e.g., tuple identity) identification on events. Events of the same event type are grouped into homogeneous streams for real-time job propagation to partitioner 220. Raw events can be recorded for ground truth.

In operation, ingestor 210 ingests heterogeneous events, discovers event types and performs schema isolation to segregate the heterogeneous events into homogeneous event streams. For each ingested event, ingestor 210 identifies an event type—for example, identifies an event tuple identity—of the ingested event. If the event type was not previously known to the ABDS, ingestor 210 may add the event type to the adaptive data model, for example, storing the event type in association with the tenant for use by the pipeline. Ingestor 210 further writes the event to an event collection for that event type. Writing an event to an event collection for an event type may include writing the event to an event collection file 211, where each event collection file 211 is dedicated to storing events of a particular event type. Thus, there may be many event collection files 211 to which ingestor 210 writes events, where each event collection file is configured to receive events of a particular event type. In some embodiments, ingestor 210 writes the raw events (the events as ingested) to the event collection files 211 in the same format in which the raw events were received (e.g., as XML, JSON objects or events according to other formats). The event collection files 211 may be stored in an event collection temporary storage (TPS) 212.

Ingestor 210 may apply configurable rules to determine when an event collection is complete. Based on a determination that an event collection is complete, ingestor 210 can close the event collection and place an event collection ready message in a partitioner queue 214, the event collection ready message indicating that an event collection of homogeneous events is available for processing by partitioner 220. Ingestor 210 may close an event collection by closing event collection file 211 for that event collection and storing the event collection file to TPS 212. The event collection ready message may include an indication of an event type, such as an event tuple identity. The event collection ready message may include an indication of a completed event collection, such as the filename in TPS 212 of an event collection file 211 for that event collection.

According to one embodiment, ingestor 210 tracks an event collection start time for each event collection. For example, ingestor 210 may track a time an event collection file 211 is created, the time when an event is first added to the event collection file or other time indicating the start of an event collection. Ingestor 210 may keep the event collection open for a configurable a partitioning time period (say five minutes). At the end of the partitioning time period, ingestor 210 may close the event collection, place an event collection ready message in partitioner queue 214 and open a new event collection for the event type. Thus, each event collection for an event type may hold a configurable time period's worth of events (e.g., five minutes of events). In some embodiments, the partitioning time period may be specified on a per-event type basis (e.g., in the partition management configuration 126).

In addition or in the alternative, ingestor 210 may be configured with an event collection size limit, such as an event collection file size limit. When an event collection reaches the event collection size limit—for example, if ingestor 210 determines that it cannot write an additional event to the event collection file 211 without exceeding the event collection size limit—ingestor 210 may close the event collection, place an event collection ready message in partitioner queue 214 indicating that the event collection is complete and open a new event collection for the event type. According to one embodiment, ingestor 210 may open an event collection file for an event type and begin writing new events of the event type to the event collection file. The event collection size limit can be selected to be smaller than the block size used by main store 206. In some embodiments, the event collection size limit may be specified on a per-event type basis.

The partitioning time period or event collection size limit for an event type may be selected to balance competing concerns. For example, the event collection time period or event collection time period may be selected to balance the desire to quickly propagate new events along the pipeline for real-time aggregation and analyses against the efficiencies gained from having a number of events together when performing relational operations.

Partitioner 220 performs event partitioning according to configuration. Partitioner 220 writes events to tuple/time/schema partitions. The tuple/time/schema partitions can provide a data model upon which relational aggregations and analyses are based. Tuple/time/schema partitions can be propagated to aggregator for real-time update to dependent aggregations.

The adaptive processing model can be reactive to the propagation of a collection of homogeneous events to discover an event schema for events in the collection and write the events from a collection to a micro-batch according to a structured format that reflects the schema. In operation, partitioner 220 reads event collection ready messages from partitioner queue 214. For each event collection ready message, partitioner 220 reads the corresponding event collection from TPS 212. Partitioner 220 determines if the event schema for the event type associated with the event collection is known. For example, partitioner 220 can determine if an event schema (e.g., an event schema 124 of FIG. 1) is associated with the event type (e.g., tuple identity) in a schema database. If the event schema for the event type is unknown, partitioner 220 can perform schema discovery to discover the event schema for the event type. For example, partitioner 220 may infer an SQL schema for an event type from a collection of events of that event type. Partitioner 220 can update the adaptive data model to include the discovered schema, for example storing the discovered event schema in association with the event type (e.g., event tuple identity) in an event schema database or other data store for use by the pipeline. The discovered event schema may be made available to a user for schema enrichment.

Partitioner 220 writes the event collections to micro-batches, where each micro-batch may represent a time/event type/schema partition. Each micro-batch 221 contains a set of events of a particular event type (events that conform to the same event schema) organized according to a structured format that reflects the event schema for the event type. Storing the events from the event collection to a micro-batch 221 may include creating tables or columns in a database or otherwise configuring a micro-batch data storage structure to have the structured format. For example, partitioner 220 may use the schema declared or discovered for the event type to create a table for storing a micro-batch of events of the event type, where the table has columns that correspond to schema fields for the event type. Partitioner 220 may also add system or housekeeping fields, such as micro-batch time and micro-batch id.

According to one embodiment, partitioner 220 uses a columnar data storage format for micro-batches—that is, partitioner 220 uses a data storage format that stores (e.g., serializes) data by column rather than rows. For example, partitioner 220 may store each micro-batch as a file according to the APACHE PARQUET data storage format (APACHE PARQUET is a Trademark of the Apache Software Foundation, Wakefield Mass.). Partitioner 220 stores micro-batches 221 in short term storage (STS) 222, which may comprise a database that supports a query language, such as SQL.

Partitioner 220 may apply rules to determine when a micro-batch 221 is complete. Based on a determination that a micro-batch 221 is complete, partitioner 220 can close the micro-batch 221 and place a micro-batch ready message in an aggregation queue 224. For example, partitioner 220 may close a micro-batch 221 by closing a micro-batch file and storing it to STS 222. The micro-batch ready message may include an indication of an event type, such as an event tuple identity. The micro-batch ready message may include an indication of a completed micro-batch, such as the filename of a micro-batch in STS 222.

Partitioner 220 may implement a variety of rules based on timing, micro-batch size or other parameters to determine when a micro-batch 221 is complete. According to some embodiments, partitioner 220 creates a new micro-batch for each event collection (e.g., creates a new micro-batch 221 in STS 222 for each event collection file 211 that it selects from TPS 212). In such an embodiment, partitioner 220 may place a micro-batch ready message in aggregator queue 224 once all the events from an event collection have been written to the micro-batch 221 for that event collection. In other embodiments, partitioner 220 may store events from multiple event collections of the same event type (e.g., from multiple event collection files) to the same micro-batch.

When partitioner 220 has completed writing events from an event collection to a micro-batch 221, partitioner 220 may delete the event collection from TPS 212. In some cases, however, partitioner 220 may be configured to retain the event collection in long-term storage. For example, partitioner 220 may be configured to copy the event collection file to backup and failure store (BFS) 226 before deleting the event collection file from TPS 212. Partitioner 220 may also be configured to back up micro-batches 221 to BFS 226.

Micro-batches 221 may be substantially smaller than the block size used by main store 206. Coalescer 230 can be configured to coalesce micro-batches 221 from STS 222 into larger partitions 231 in main store 206. More particularly, coalescer 230 reads micro-batches from STS 222 according to a schedule and coalesces the micro-batches into partitions 231 in long term store (LTS) 232. LTS 232 may comprise a database that supports a query language, such as SQL.

Coalescer 230 may coalesce micro-batches on a configurable schedule, for example coalescer 230 may coalesce micro-batches daily. There may be thousands of micro-batches for an event type, each micro-batch containing thousands of events each and all these events can be written to an LTS partition 231 that uses the same columns as the micro-batches from which the events were selected. Because an LTS partition 231 may be relatively large, it is more likely to fill blocks written to main store 206.

To coalesce micro-batches into an LTS partition, coalescer 230 selects all the micro-batches 221 for an event type (e.g., for a given event tuple identity) that fall within a time window and writes the events from the selected micro-batches 221 to an LTS partition 231 in LTS 232. The LTS partition 231 may use the same micro-batch data storage format and structure as the micro-batches 221 coalesced into the LTS partition 231. Coalescing micro-batches 221 into an LTS partition 231 may thus comprise reading the events from the micro-batches 221 and writing the events from multiple micro-batches to an LTS table or file using that uses the same data storage format and structure. For example, micro-batches 221 for a first event type may be stored as APACHE PARQUET files having a first set of columns and the events from those micro-batches 221 may be coalesced into an LTS partition 231 that is stored as an APACHE PARQUET file that includes the same set of columns.

Aggregator 240 performs event aggregation, producing the relational result of an aggregation rule as a materialized subset of events. Aggregation rules may be specified as relational predicates. In general, an aggregation rule may specify one or more event types that are subject to aggregation and conditions for selecting events of those event types, such as metadata field values to be included in aggregated events. Aggregations can preserve event schema for relational composition. Aggregator 240 automatically updates real-time aggregations upon propagation of dependent micro-batches.

In operation, aggregator 240 may run aggregation jobs that comprise aggregation rules. When an aggregation job is initially run, aggregator 240 selects events stored in LTS 232 and STS 222 that meet the conditions of an aggregation rule. More particularly, aggregator 240 queries LTS 232 to select events from LTS partitions 231 meeting the aggregation rule conditions and writes the selected events to an aggregation 241 for the aggregation job. It can be noted, however, that there may be one more micro-batches 221 in STS 222 that contain events subject to an aggregation rule, where the micro-batches have not yet been coalesced into an LTS partition 231. Aggregator 240 may thus query STS 222 to select events from micro-batches 221 that meet the aggregation rule conditions and write the selected events to the aggregation 241 for the aggregation job. Thus, an aggregation 241 may combine events that have been coalesced into LTS partitions 231 and events that have not yet been coalesced.

The adaptive processing model can be configured to react a propagation of a new micro-batch to create a real-time aggregation. Thus, aggregator 240 can incorporate real time events as micro-batches are propagated. For example, a new micro-batch 221 may be added to STS 222 and the micro-batch propagated to aggregator 240 via aggregation queue 224. When aggregator 240 reads a micro-batch ready message from aggregation queue 224, aggregator 240 can determine if the event type (e.g., tuple identity) is subject to any active aggregation job. If the micro-batch ready message indicates that a new micro-batch 221 of events is ready, where the new micro-batch 221 is for an event type subject to an active aggregation job, aggregator 240 queries STS 222 to select events meeting the aggregation rule conditions from the new micro-batch 221 and writes the selected events to a real-time aggregation 241 for the aggregation job.

According to one embodiment, each aggregation 241 may comprise events of a particular event type. An aggregation may thus use the same data storage format and structure as the micro-batches 221 and LTS partitions 231 from which the events in the aggregation 241 were selected. In some embodiments, an aggregation may comprise events of different event types. In such an embodiment, an aggregation may comprise a set of tables, having a table for each event type represented by the aggregated events, where the table for an event type uses the same structured format (e.g., set of columns) as the LTS partition or micro-batches from which the events of that event type were selected.

Aggregator 240 may store aggregations 241 in an aggregation store. In some embodiments, aggregations 241 are stored as short-term aggregations in an aggregation short term store (AGSTS) 242 residing in fast store 204. AGSTS 242 may comprise a database that supports a query language, such as SQL. Coalescer 230 can select short term aggregations 241 from AGSTS 242 (e.g., based on event type given event tuple identity) that fall within a time window and coalesce the aggregations into a long-term aggregation 245 in an aggregator long term store (AGLTS) 243. The long-term aggregation 245 may use the same structured format as the short-term aggregations 241. Coalescing aggregations 241 into an aggregation 245 may thus comprise reading the events from aggregations 241 and writing the events from multiple aggregations 241 to an LTS table or file using that uses the same structured format (e.g., columns).

Aggregator 240 places an aggregation ready message in analyzer queue 244, the aggregation ready message indicating that an aggregation 241 is available for processing by analyzer 250. The aggregation ready message may include an indication of an event type, such as an event tuple identity. The aggregation ready message may include an indication of an aggregation, such as the filename of a file used to store the aggregation 241 in AGSTS 242 or other location information for the aggregation. According to one embodiment, aggregator 240 may place an aggregation ready message in analyzer queue 244 when it has finished writing all events selected from LTS 232 and STS 222 that meet the aggregation rule to an aggregation 241. Aggregator 240 may also place an aggregation ready message in analyzer queue when aggregator 240 creates a real-time aggregation 241.

A user may define arbitrary analysis rules over aggregations. According to one embodiment, analysis rules are defined in the form of relational predicates on aggregations. An analysis rule may for example specify a count of all the events of an event type (for that tenant) meeting specified conditions, for example, a count of all the events in an aggregation. Analyzer 250 may apply the analysis rules to aggregations, such as aggregations in AGSTS 242 and AGLTS 243.

In operation, analyzer 250 runs analysis jobs that comprise analysis rules. When an analysis job is initially run, analyzer 250 selects events stored in AGLTS 243 and AGSTS 242 that meet the analysis rule conditions for the analysis job. More particularly, analyzer 250 can queries AGLTS 243 to select events from aggregations 245 meeting the analysis rule conditions and apply the functions or transformations specified in the analysis rule to the selected events. For example, analyzer may determine a count of the events in an aggregation 245, which is just one example of an analysis—analyzer 250 may apply arbitrarily complex functions (e.g., SQL functions) to aggregations 241, 245.

Analyzer 250 also queries AGSTS 242 to select events from aggregations 241 meeting the analysis rule conditions and applies the functions or transformations specified in the analysis rule to the selected events. For example, analyzer may determine a count of the events in an aggregation 241. Analyzer 250 can combine the results of applying an analysis rule to a long-term aggregation 245 and a short-term aggregation 241 to produce an analysis result for an analysis job.

The adaptive processing model may be configured to react to a propagation of a real-time aggregation of events to generate a real-time analysis result. When analyzer 250 reads an aggregation ready message from analysis queue 244, analyzer 250 can determine if the event type (e.g., tuple identity) is subject to any active analysis job. If the analysis ready message indicates that a new aggregation 241 of events is ready, where the new aggregation 241 is for an event type subject to an active analysis job, analyzer 250 queries AGSTS 242 to select events meeting the analysis rule conditions from the new aggregation 241 and applies the analysis rule to the selected events to generate a real-time analysis result. For example, analyzer 250 counts the number of events in the new aggregation meeting and analysis rule conditions. Analyzer 250 places analyzer results in an analysis result queue 252. The analysis results may be read by a variety of other processes to be used in workflows, for reporting or for other purposes.

Figure 6:
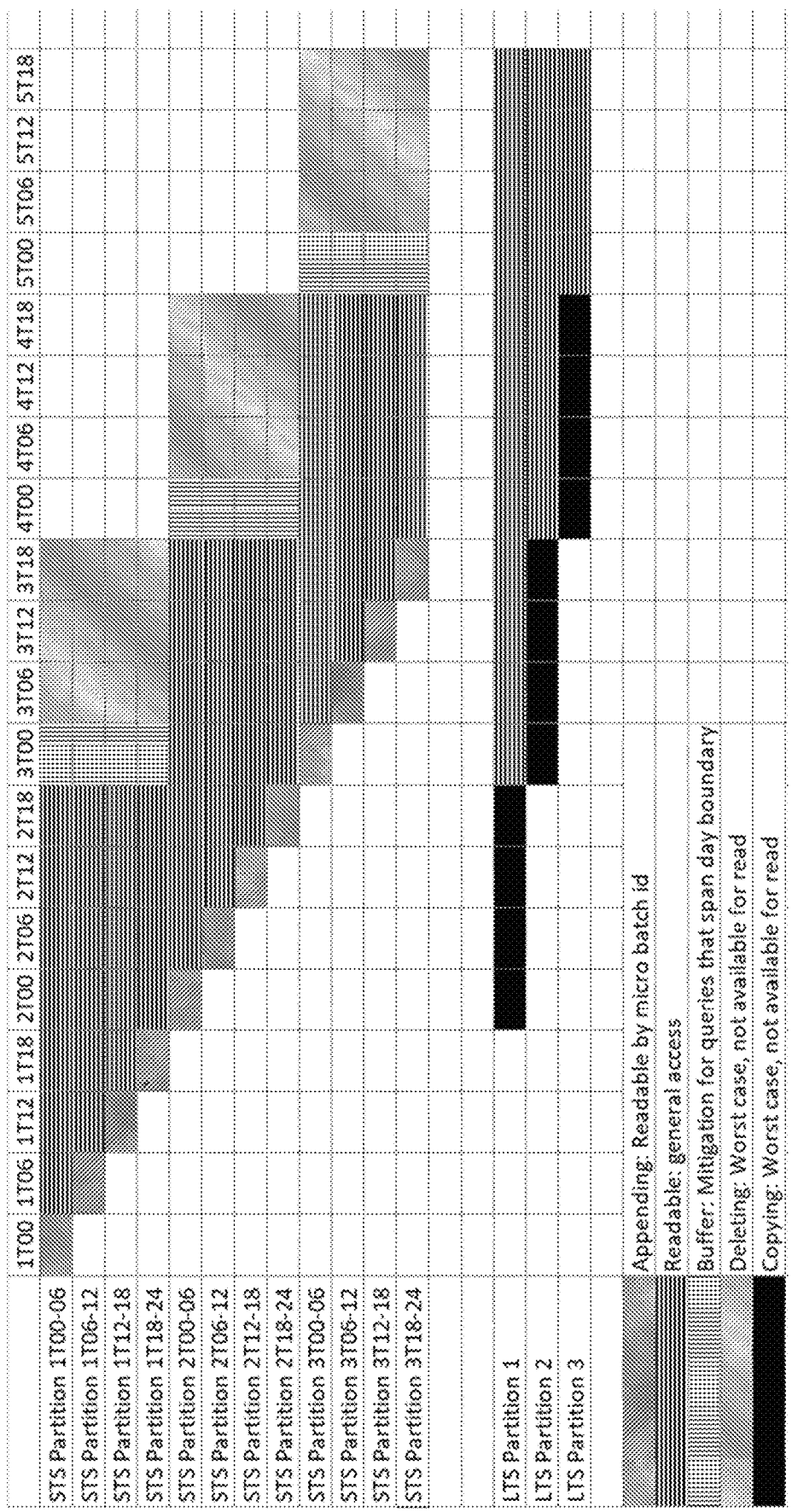
FIG. 6 illustrates one embodiment of a schedule for coalescing micro-batches.

As will be appreciated from the foregoing, there may be multiple processes reading from or writing to micro-batches or LTS partitions. The pipeline may implement rules to ensure proper data coalescing and aggregation and to reduce or eliminate aggregating duplicative entries. Turning briefly to FIG. 6, FIG. 6 illustrates a schedule starting at t=0 where the columns represent six-hour time increments. STS Partition 1T00-060 represents a micro-batch created day 1, 00:00-06:00; STS Partition 1T06-12 represents a micro-batch created day 1, 06:00-12:00 and so on. It can be noted that six-hour time increments are used simply for illustration. In various implementations, a micro-batches may contain a smaller amount of data. For example, according to one embodiment, micro-batches may be dynamically sized and may contain, for example, less than five minutes of data.

In any case, during an appending stage, a micro-batch is in a first state in which partitioner 220 is writing events to the micro-batch. During this time, there is limited access to the micro-batch and aggregator 240 cannot select events from the micro-batch. At 1T06, STS Partition 1T00-06 is ready and is fully readable by aggregator 240.

At time 2T00, coalescer 230 begins coalescing micro-batches corresponding to a time window into LTS Partition 1. For example, coalescer 230 begins coalescing micro-batches from the previous day and thus begins coalescing STS Partition 1T00-06, Partition 1T06-12, Partition 1T12-18, Partition 1T18-24 into LTS Partition 1. Partition 1 may be considered not readable for reading during a coalescing time period even if coalescer 230 does not need the entire time period. In the example of FIG. 1, LTS Partition 1 is not readable from a full day.

At 3T00 then, LTS Partition 1 is made available for reading by aggregator 240. There may be some cases where queries cross day boundaries (or other coalescing boundaries). Coalescer 230 may maintain a micro-batch in STS 222 for a buffer period after the coalescing period in which the micro-batch was coalesced into an LTS partition. For example, the coalescing period for LTS Partition 1 ends at 3T00, but coalescer 230 does not begin deleting or mark for deletion STS Partition 1T00-06, Partition 1T06-12, and Partition 1T12-18 until after a buffer period.

It can be noted that, during the buffer period, events from a micro-batch are available in both the micro-batch and the LTS partition to which the micro-batch was coalesced. For example, in the period 3T00-3T06, STS Partition 1T00-006 may still be available in STS 222, while LTS Partition 1 into which STS Partition 1T00-006 was coalesced is available in LTS 232. During the buffer period for a micro-batch, queries that have already started to be processed on the micro-batch can be completed, but new queries on the micro-batch will not be executed.

A similar paradigm may be used for coalescing short-term aggregations into long-term aggregations and controlling querying of aggregations in AGSTS 242 and AGLTS 243.

Figure 7:
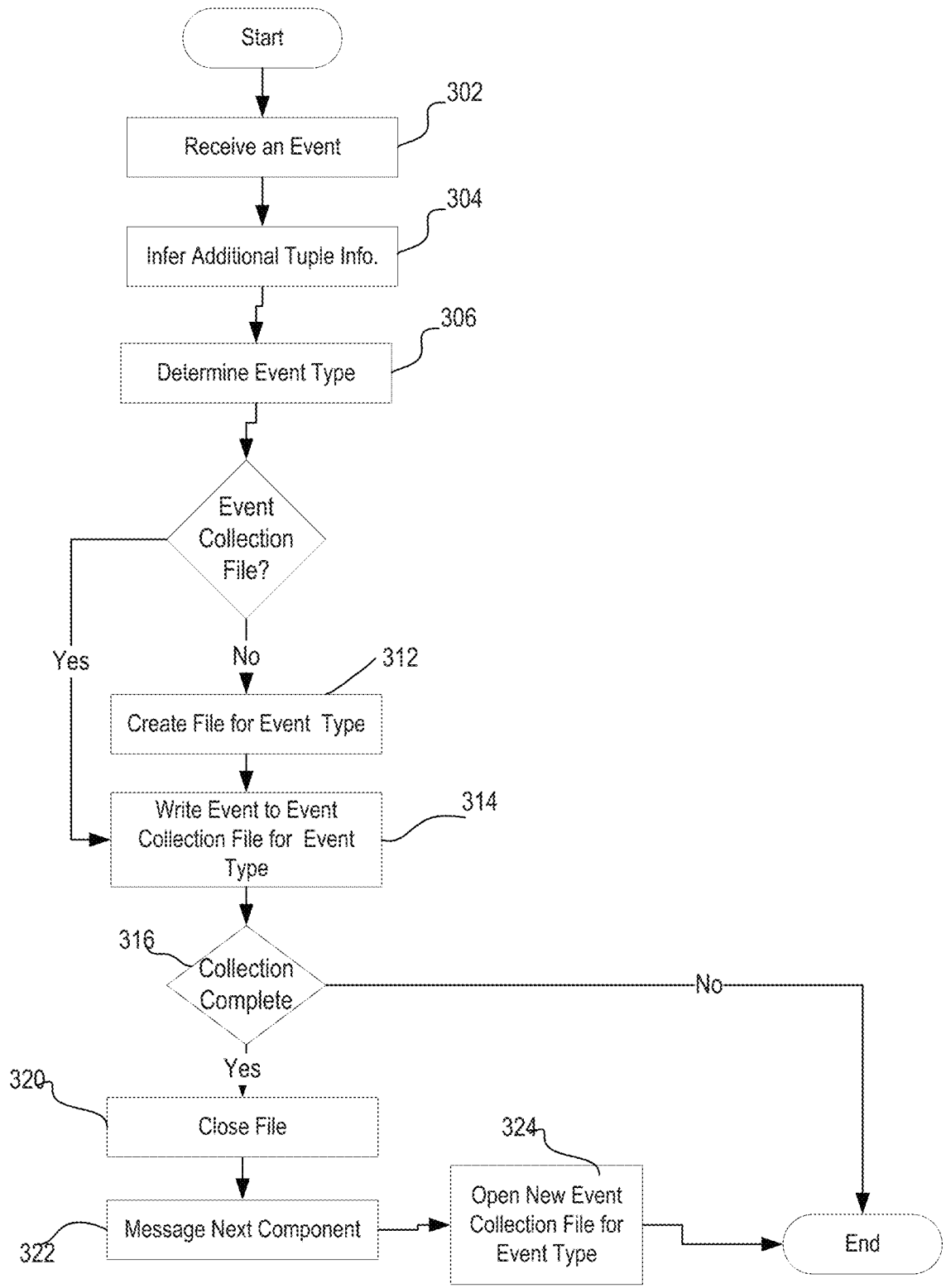
FIG. 7 is a flow chart of one embodiment processing an event.

FIG. 7 is a flow chart of one embodiment processing an event. In various embodiments, the method of FIG. 7 may be performed by an event processing system, such as event processing system 100. One or more steps may be performed by an ingestor, such as ingestor 210, in an event processing pipeline.

An event from a data source is received (step 302). Metadata field values for the event may be inferred (step 304). Specifically, a portion of an event tuple identify may be inferred. For example, if the event does not include a tenant id, the tenant id may be inferred, and the event updated. As another example, if the event does not include a schema version, the schema version may be inferred and the event updated.

Event type discovery is performed on the event (step 306). For example, the event tuple identity can be determined from the event metadata. If the event type (e.g., event tuple identity) was not previously known, the event type can be added to the adaptive data model (e.g., by storing the event type in association with the tenant).

Schema isolation is performed based on the event type. For example, the event is written to a homogeneous event collection. If there is not an event collection available to receive the event, a new event collection for the event type is created (step 312). The event is written to the event collection (step 314). If there is an event collection open to receive events of the event type determined at step 306, the event is written to that event collection (step 314). For example, the event is written to an event collection file for the event type. In some embodiments, the event is written to the event collection in the same format in which the raw events were received (e.g., as XML, JSON objects or events according to other formats).

An event collection may be considered to be complete based on a variety of factors. According to one embodiment, an event collection can be considered complete if the elapsed time associated with the event collection has reached a threshold. As another example, the event collection may be considered complete if the event collection file has reached a threshold size. When it is determined that the event collection is complete (step 316), the event collection file can be closed and written to storage (e.g., TPS) (step 320) and the event collection propagated by passing a collection ready message to the next process in the pipeline (step 322). According to one embodiment, the event collection ready message can be placed in a partitioner's message queue. The event collection ready message may indicate an event type (e.g., an event tuple identity) and a name or location of the event collection file. In some embodiments, a new event collection can be defined for the event type. For example, a new event collection file may be created and opened for the event type. (step 324).

FIG. 7 is merely an illustrative example and the disclosed subject matter is not limited to the ordering of or number of steps illustrated. Embodiments may implement additional steps or alternative steps, omit steps, or repeat steps. For example, the steps of FIG. 7 may be repeated for each event.

Figure 8:
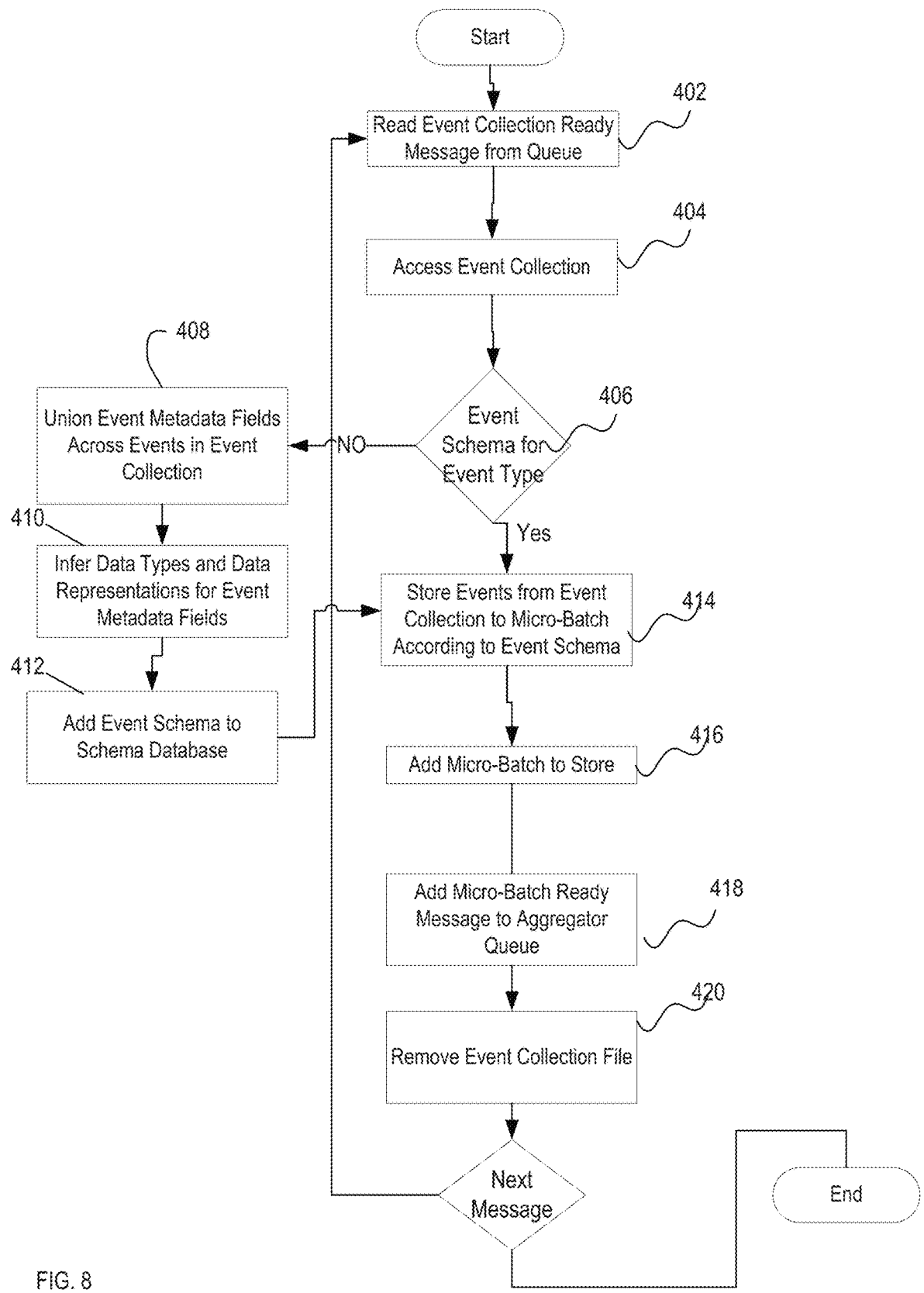
FIG. 8 is a flow chart illustrating one embodiment of partitioning events into a micro-batch.

FIG. 8 is a flow chart illustrating one embodiment of partitioning events into a micro-batch. In various embodiments, the method of FIG. 8 may be performed by an event processing system, such as event processing system 100. In various embodiments, the method of FIG. 8 may be performed by a partitioner, such as partitioner 220, in an event processing pipeline.

The adaptive processing model can be configured to react to a propagation of a collection of homogeneous events of an event type. Reacting to the propagation of the collection of homogeneous events can include determining an event schema for the event type and storing the events from the collection of homogeneous events to a micro-batch according to a structured format that reflects the determined event schema.

As discussed above, an event collection ready message may be added to a message queue. Thus, the event collection ready message can be read from the queue (step 402). The event collection ready message may indicate an event type (e.g., an event tuple identity) and a name or location of the event collection (e.g., the name or location of an event collection file). The event collection corresponding to the event collection ready message can be accessed (step 404). For example, an event collection file indicated the event collection read message can be accessed and the events read from the event collection file.

The adaptive processing model can be configured to determine if the adaptive data model includes the event schema for the event type of events in the event collection. A determination is made whether the event schema for the event type is known (step 406). For example, a database can be queried for an event schema associated with the event tuple identity of the events in the event collection. If the event schema is known, control passes to step 414. If the event schema is not known, event schema discovery can be performed before proceeding to step 414.

If the event schema for the event type is not already part of the adaptive data model, the adaptive processing model can be configured to determine the event schema by discovering the event schema from the events in the collection of homogeneous events. Thus, if the event schema for the event type is not known as determined at step 406, schema discovery for the event type can occur. According to one embodiment, this may include establishing a portion of the schema based on required common event metadata or recommended common event metadata in a reference model. Determining the event schema for an event type may also include performing a union of type-specific event metadata fields (for example, unique type-specific metadata fields) in the events of the homogeneous event collection to determine a set of schema attributes (step 408). The data types and data representations for the schema attributes may be determined from the reference event model or inferred from the events of the event collection (step 410). The discovered event schema may be added to the adaptive data model, for example by adding the event schema to the event schema database (step 412). Control may then pass to step 414.

The events from the event collection are stored as a micro-batch in a micro-data storage structure that has a structured format that reflects the schema (step 414). Storing the events from the event collection to the micro-batch may include creating tables or columns in a database or otherwise configuring a micro-batch data storage structure to store the events according to the structured format that reflects the schema. According to one embodiment, the schema for the event type may be used to create a micro-batch data storage structure, such as a database table or file, that includes columns that correspond to schema fields in the event schema. The column names may preserve event metadata nesting and scoping. Additional columns may also be added and populated. Storing the events to the micro-batch may include additional micro-batch metadata to each event. For example, micro-batch id and micro-batch time may be assigned to the events in a micro-batch.

The micro-batch may be saved to a data store (e.g., STS 222) (step 416) and the micro-batch propagated to the next process in the pipeline by providing a micro-batch ready message provided to a next process in the pipeline (step 418). The micro-batch ready message may indicate an event type (e.g., an event tuple identity) and a name or location of the micro-batch.

The event collection accessed at step 404 may be deleted (step 420). For example, an event collection file may be deleted from TPS 212. As discussed above, the event collection may be backed up to a backup store prior to deletion from the temporary store.

FIG. 8 is merely an illustrative example and the disclosed subject matter is not limited to the ordering of or number of steps illustrated. Embodiments may implement additional steps or alternative steps, omit steps, or repeat steps. By way of example, but not limitation, the steps of FIG. 8 may be repeated for each event collection complete message.

Figure 9:
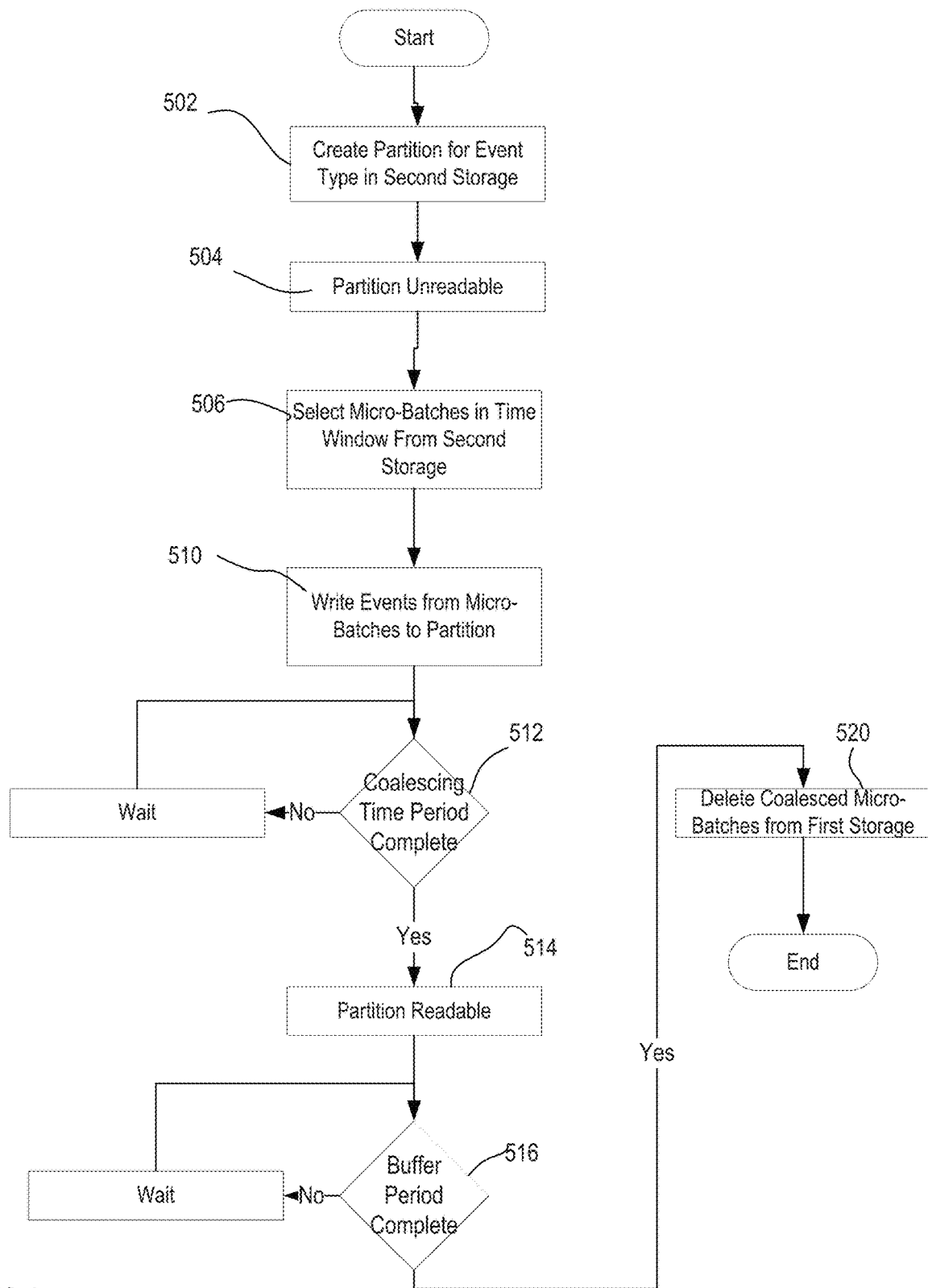
FIG. 9 is a flow chart illustrating one embodiment of coalescing micro-batches into a partition.

FIG. 9 is a flow chart illustrating one embodiment of coalescing micro-batches into a partition. In various embodiments, the method of FIG. 9 may be performed by an event processing system, such as event processing system 100. In various embodiments, the method of FIG. 9 may be performed by a coalescer, such as coalescer 230, of an event processing pipeline.

At step 502, a partition (e.g., an LTS partition) is created for an event type. Readers/writers may be orchestrated to preclude conflict and duplication. For example, in step 504 readers may be orchestrated not to read from the partition. In addition or in the alternative, the partition may be locked to prevent reading. A set of micro-batches to coalesce into the partition are selected from a data store (e.g., from STS 222). For example, micro-batches for a particular event type and that have a batch date/time within the last day (or other coalescing time window) are selected. The events from the selected micro-batches are written to the partition (step 510). The partition may use the same data storage format and structure as the micro-batches coalesced into the partition.

Read access is prevented (e.g., via orchestration of the readers or locks) until a configurable coalescing period has elapsed even if the entire coalescing period is not required to write all the events from the selected micro-batches to the partition. When it is determined that the coalescing time period has elapsed (as determined at step 512), the partition is fully readable (step 514). For example, readers may begin reading from the partition or a lock on the partition released. When a configurable buffer period has elapsed, as determined at step 516, the micro-batches selected at step 506 may be deleted (step 520). For example, the micro-batches may be deleted from STS 222.

FIG. 9 is merely an illustrative example and the disclosed subject matter is not limited to the ordering of or number of steps illustrated. Embodiments may implement additional steps or alternative steps, omit steps, or repeat steps. By way of example, but not limitation, the steps of FIG. 9 may be repeated for each event type according to a schedule.

Figure 10:
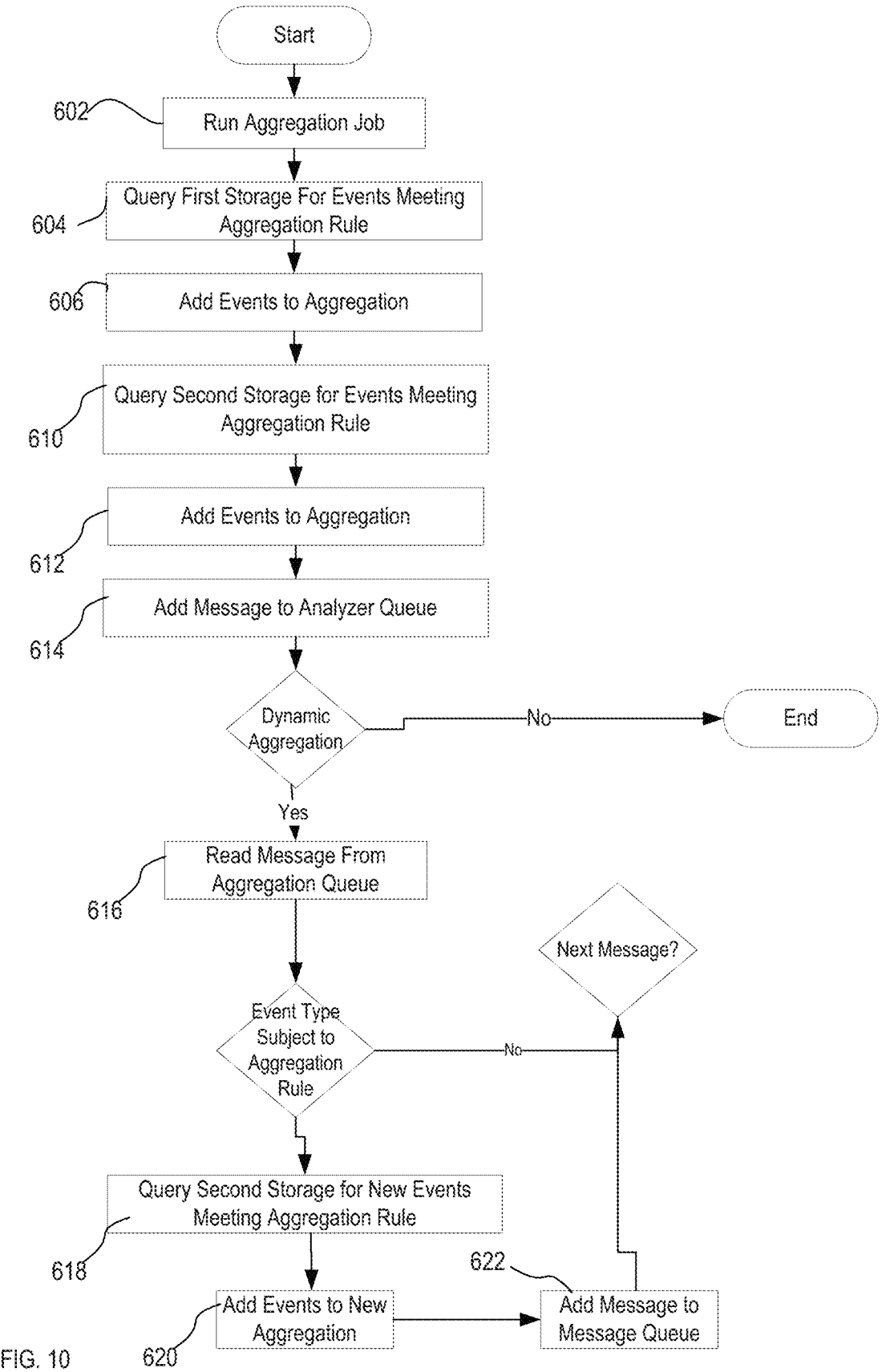
FIG. 10 is a flow chart regarding one embodiment of an aggregation method.

FIG. 10 is a flow chart regarding one embodiment of an aggregation method. In various embodiments, the method of FIG. 10 may be performed by an event processing system, such as event processing system 100. In various embodiments, the method of FIG. 10 may be performed by an aggregator, such as aggregator 240.

An aggregation rule may be received (step 602). For example, a user may define aggregation rules over the logical event schema. Aggregation rules may refer to one or more event types, event metadata fields or other criteria. Aggregation rules may define fixed aggregations (aggregations using only historical data) or dynamic aggregations (aggregations that incorporate new events in real time). A user may also define retention policies for aggregations.

The aggregation rule may be executed as part of an aggregation job. According to one embodiment, a first partitioned event store (e.g., LTS 232) is queried to select events that meet the conditions of the aggregation rule (step 604) and the selected events added to an aggregation for the aggregation job (e.g., a short-term aggregation) (step 606). A second partitioned event store (e.g., STS 222) is also queried to select events that meet the criteria of the aggregation rule (step 610). The selected events may be written to the aggregation for the aggregation job (step 612). At this point, the batch aggregation for the aggregation job can be considered complete and a message may be provided to the next process in the pipeline that a short-term aggregation is complete (step 614). For example, an aggregation ready message may be added to an analyzer queue. If the aggregation job defines a static aggregation the method can end.

If the aggregation job defines a dynamic aggregation (for example has an end date in the future or has an open-ended end date), the aggregation rule can be applied to new micro-batches as they are propagated. Thus, the adaptive processing model can be configured to react to a propagation of a new micro-batch by creating a real-time aggregation of events using events from the new micro-batch and propagating the real-time aggregation of events.

For example, a new micro-batch ready message can be read from the message queue (step 616). If the message indicates an event type that is not subject to the aggregation rule, the aggregator can wait for a next message. If the event type indicated in the micro-batch ready message is subject to the aggregation rule, the second partitioned event store (e.g., STS) can be queried to select events from the new micro-batch that meet the conditions of the aggregation rule (step 618) and the selected events can be added to a new aggregation (e.g., a real-time short-term aggregation 241) (step 620). The aggregation 241 can be propagated to a next process in the pipeline. For example, an aggregation ready message can be added to the queue of the next process in the pipeline (622).

FIG. 10 is merely an illustrative example and the disclosed subject matter is not limited to the ordering of or number of steps illustrated. Embodiments may implement additional steps or alternative steps, omit steps, or repeat steps. For example, steps may be repeated for each aggregation rule in an aggregation job and for multiple aggregation jobs.

Figure 11:
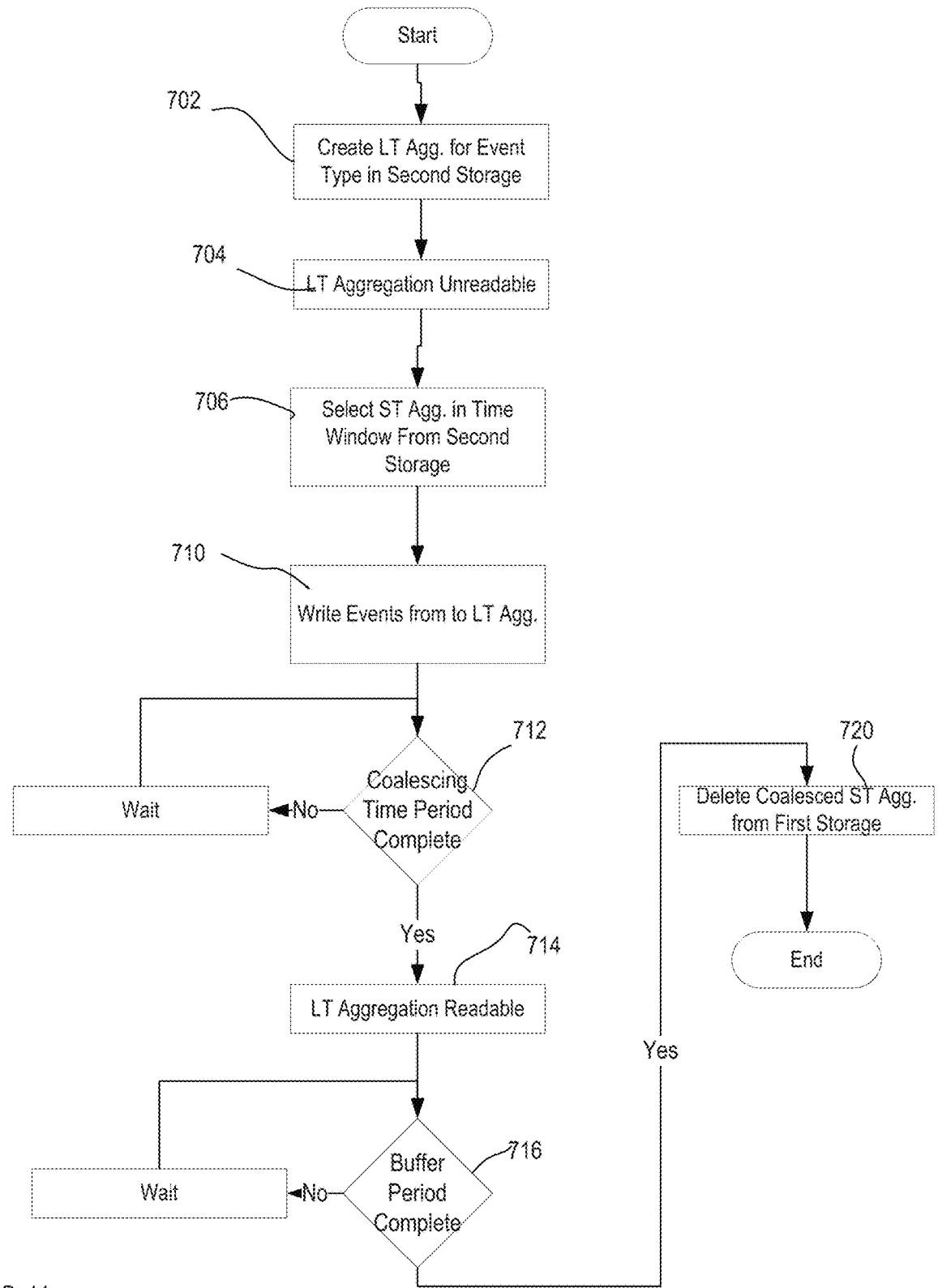
FIG. 11 is a flow chart illustrating one embodiment of coalescing aggregations.

FIG. 11 is a flow chart illustrating one embodiment of coalescing aggregations (e.g., short-term aggregations 241) into a coalesced aggregation (e.g., a long-term aggregation 245). In various embodiments, the method of FIG. 11 may be performed by an event processing system, such as event processing system 100. In various embodiments, the method of FIG. 11 may be performed by a coalescer, such as coalescer 230, in an event processing pipeline.

A long-term aggregation (e.g., an LT aggregation) is created for an event type (step 702). Readers/writers may be orchestrated to preclude conflict and duplication. For example, in step 704 readers may be orchestrated not to read from the partition. In addition or in the alternative, the partition may be locked to prevent reading. A set of short-term aggregations that contain events of the event type and that fall within a configurable time window are selected (e.g., from AGSTS 242) (step 706). For example, short-term aggregations 241 for a particular event type and that were created within the last day are selected. The events from the selected short-term aggregations are written to the LT aggregation (step 710). According to one embodiment, the LT aggregation uses the same data storage format and structure as the short-term aggregations coalesced into the LT aggregation.

Read access is prevented (e.g., via orchestration of the readers or locks) until a configurable coalescing period has elapsed even if the entire coalescing period is not required to write all the events from the selected micro-batches to the partition. When it is determined that the coalescing time period has elapsed (as determined at step 712), the partition is fully readable (step 714). For example, readers may begin reading from the partition or a lock on the partition released. When a configurable buffer period has elapsed, as determined at step 716, the short-term aggregations selected at step 706 may be deleted (step 720). For example, the short-term aggregations may be deleted from AGSTS 242.

FIG. 11 is merely an illustrative example and the disclosed subject matter is not limited to the ordering of or number of steps illustrated. Embodiments may implement additional steps or alternative steps, omit steps, or repeat steps. By way of example, but not limitation, the steps of FIG. 11 may be repeated for each event type according to a schedule.

Figure 12:
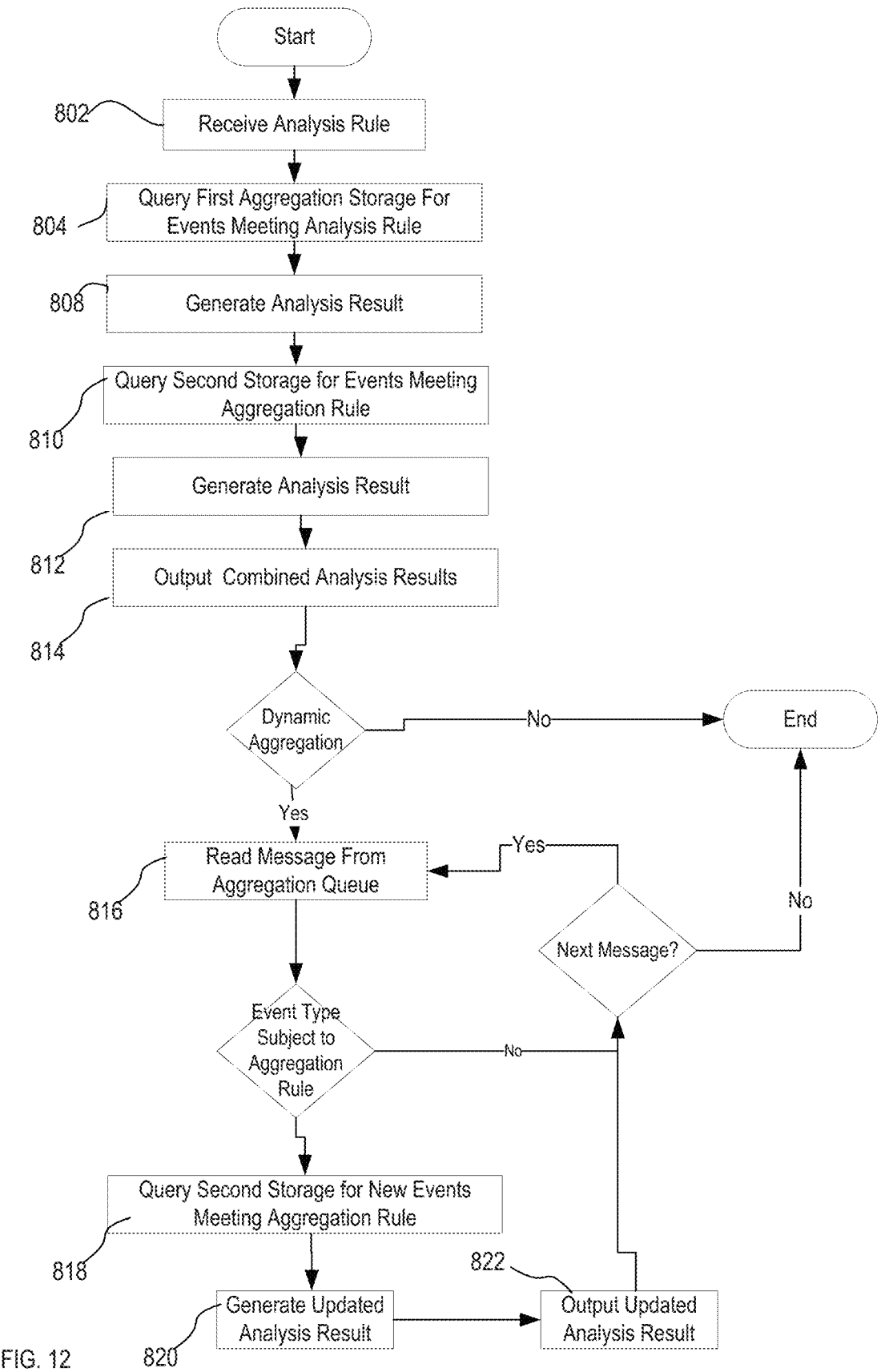
FIG. 12 is a flow chart regarding one embodiment of an analysis method.

FIG. 12 is a flow chart regarding one embodiment of an analysis method. In various embodiments, the method of FIG. 12 may be performed by an event processing system, such as event processing system 100. In various embodiments, the method of FIG. 10 may be performed by an analyzer, such as analyzer 250.

An analysis rule may be received (step 802). For example, a user may define analysis rules over the logical event schema. Analysis rules may refer to one or more event types, event metadata fields or other criteria. Analysis rules may include one or more functions, such as SQL functions, to perform over aggregations. Analysis rules may define a fixed analysis or a dynamic analysis.

The analysis rule may be executed as part of an analysis job. According to one embodiment, a first aggregation store (e.g., AGSTS 243) is queried to select events that meet the conditions of the analysis rule (step 804) and the functions or transformations of the analysis rule are applied to the events to generate an analysis result (step 808). A second aggregation store (e.g., AGSTS 242) is also queried to select events that meet the conditions of the analysis rule (step 810). The functions or transformations of the analysis rule are applied to the events to generate a second analysis result (step 812). The first and second analysis results can be output to a target location as a combined analysis result (step 814). At this point, the batch analysis for the analysis job can be considered complete and a message may be provided to the next process in the pipeline that an analysis result is ready. For example, the combined analysis results may be added to an analysis result queue 252. If the analysis job defines a static analysis the method can end.

If the analysis job defines a dynamic aggregation (for example has an end date in the future or has an open-ended end date), the analysis rule can be applied to new events. In particular, the adaptive processing model can be configured to react to a propagation of a real-time aggregation of events by applying the analysis rule to the real-time aggregation of events to generate a real-time analysis result.

For example, a new aggregation ready message can be read from the message queue (step 816). If the message indicates an event type that is not subject to the analysis rule, the analyzer can wait for a next message. If the event type indicated in the aggregation ready message is subject to the analysis rule, the second aggregation storage (e.g., AGSTS) can be queried to select events in the new aggregation that meet the conditions of the analysis rule (step 818) and functions or transformations of the analysis rule can be applied to the selected events to generate a real-time analysis result (step 820). The real-time analysis results can be output to a target location (822).

FIG. 12 is merely an illustrative example and the disclosed subject matter is not limited to the ordering of or number of steps illustrated. Embodiments may implement additional steps or alternative steps, omit steps, or repeat steps. For example, the method of FIG. 12 can be repeated for each analysis rule in an analysis job and for multiple analysis jobs.

As will be appreciated from the foregoing, embodiments described herein can provide an event processing system that implements an adaptive data model and an adaptive processing model. The adaptive data model and adaptive processing model can react to new events as they are processed to incorporate events in real-time into aggregations and analysis. The largely unconstrained nature of the data model and processing model of some embodiments can allow arbitrarily complex schema, aggregations and analysis to be incorporated.

Such event processing system can facilitate deep views into an enterprise's data across integrations and channels. According to one embodiment, an event processing system may support creating "customer journeys," where a customer journey comprises a (defined) progression of events. Every customer interaction with an enterprise is an opportunity to gather customer information and provide business insight. The event processing system can federate customer events across integrations and add analytics and visualization for better customer experiences.

Figure 13:
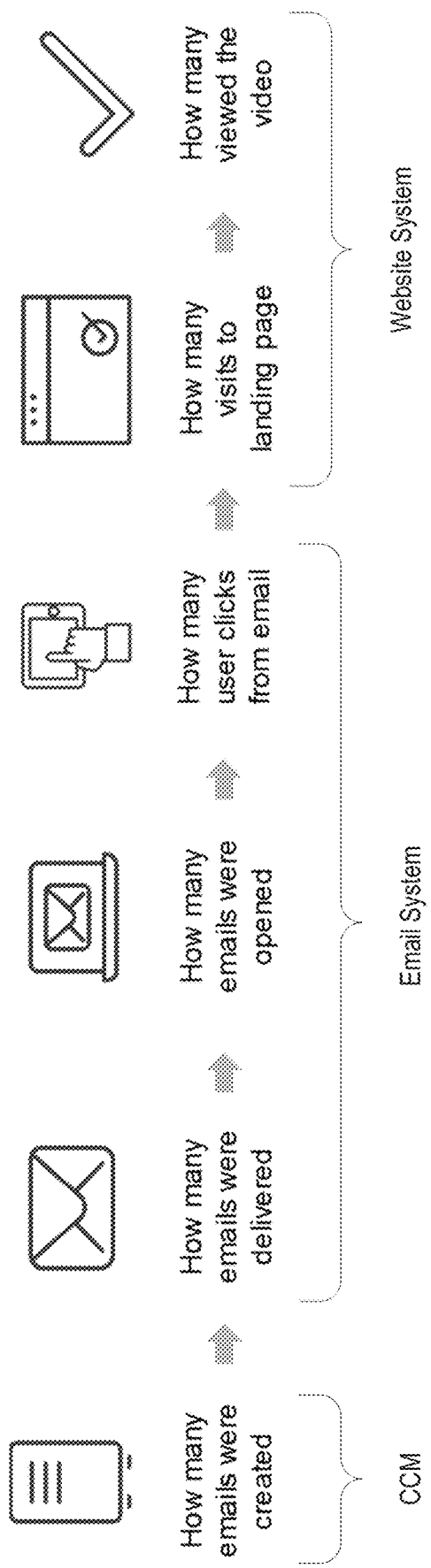
FIG. 13 is a diagrammatic representation of one embodiment of a customer journey.

One example of a customer journey is illustrated in FIG. 13. In this example, a tenant runs a quarterly market update campaign that is meant to educate customers but also draw them to the tenant's website so that they can view a video and access other resources and services provided by the tenant. The quarterly market update campaign may be implemented using various systems, such as a CCM system that creates the emails, an email system that sends the emails and receives notifications of when customers open emails or click on emails, and a web site that can track when customers visit a landing page and view the video. The actions of creating an email, delivering an email to a customer, the customer opening the email, the customer clicking on a link in the email, a customer visiting the landing page and a customer viewing a video can be modelled as events, which can be processed to provide insights, such as the impact of the campaign.

Figure 14:
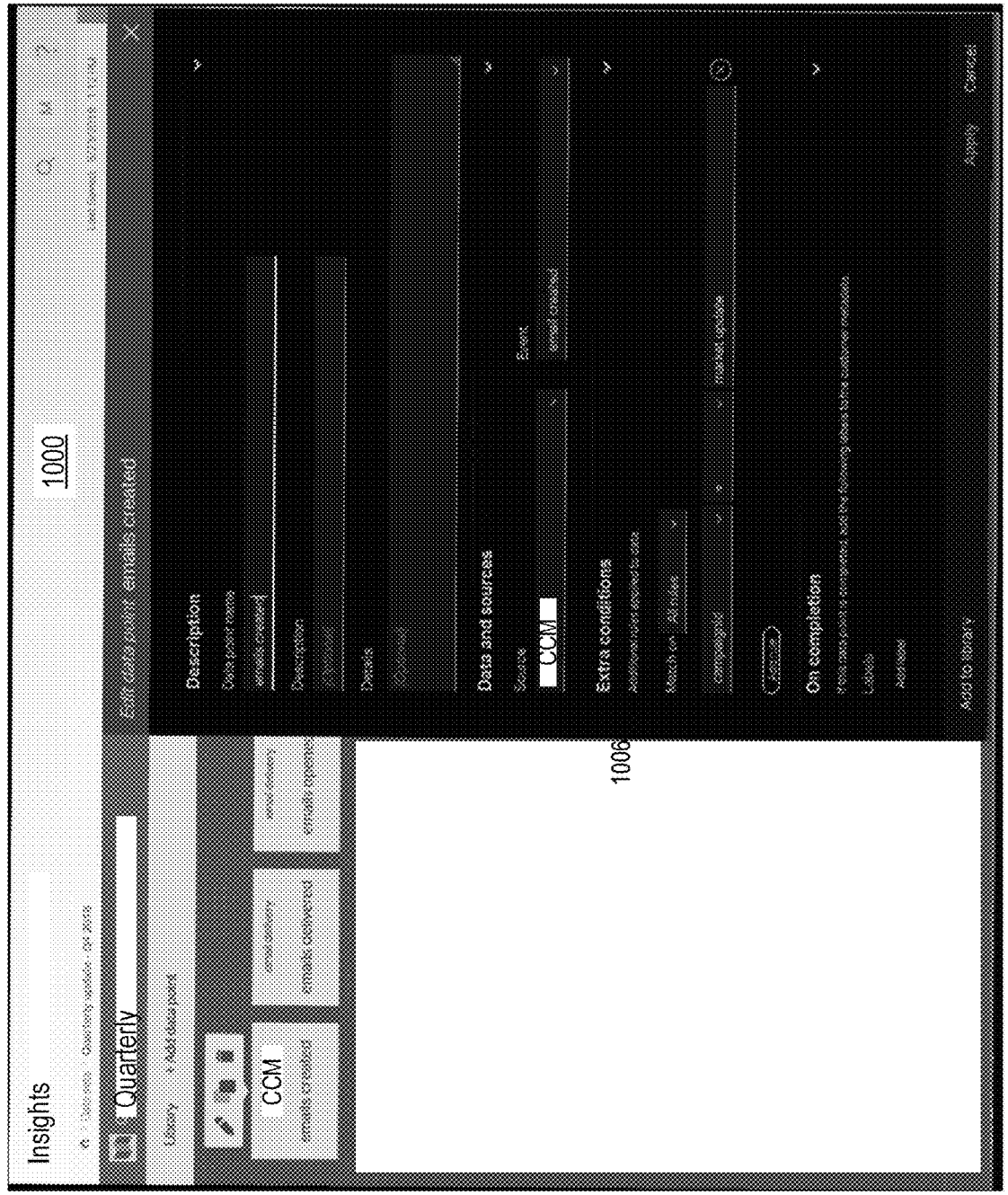
FIG. 14 is a diagrammatic representation of one embodiment of a user interface for defining a touchpoint for a customer journey.

A "quarterly market update campaign" customer journey can be defined as a set of touchpoints. FIG. 14 is a diagrammatic representation of one embodiment of a graphical user interface (GUI) for defining a touchpoint in a customer journey. GUI 1000 includes controls to allow the user to add a name, description and details for the touchpoint. In this example, GUI 1000 is being used to define an "emails created" touchpoint in the "quarterly market update campaign" customer journey of FIG. 13.

GUI 1000 further includes controls to allow a user to select a target event type(s). GUI 1000 includes a control 1002 to select a schema source and a control 1004 to select a schema type. Controls 1002 and 1004 are linked to the event types associated with the tenant, including event types declared by the user or event types discovered by the ABDS. Thus, when GUI 1000 is generated for a user associated with a tenant, control 1002 is populated with a list of schema sources associated with the tenant to allow selection of a schema source and control 1004 is populated with a list of schema types associated with the tenant to allow section of a schema type within that source. Implicit in GUI 1000 is that the event type (e.g., schema source and schema types) that is the target of the touchpoint has been declared or discovered.

GUI 1000 also includes controls 1006 to allow the user to specify rules to apply to events. Controls 1006 may be linked to the event schemas declared or discovered for the tenant. For example, control 1006 may include a dropdown list of selection options comprising event metadata fields names (schema attribute names) as specified in the event schema corresponding to the event type selected via controls 1002, 1004. In the example of FIG. 13, the dropdown list of control 1006 is populated with the field names defined in the logical schema for a ccm/email event type. Control 1006 may allow the user to specify Boolean operators on event metadata field values (e.g., only analyze events with campaignid="market update"). In this example, the aggregator can be configured to create a dynamic aggregation for the tenant where the aggregation that aggregates ccm/email events (the tenant and schema version may be implied) that have "market update" in the campaignid.

GUI 1000 further includes controls 1010 for a labeling tool. In this example, the user can specify labels to add to customer profiles based on event associated with that customer appearing in a ccm/email event. Such labels may support customer segmentation.

Figure 15:
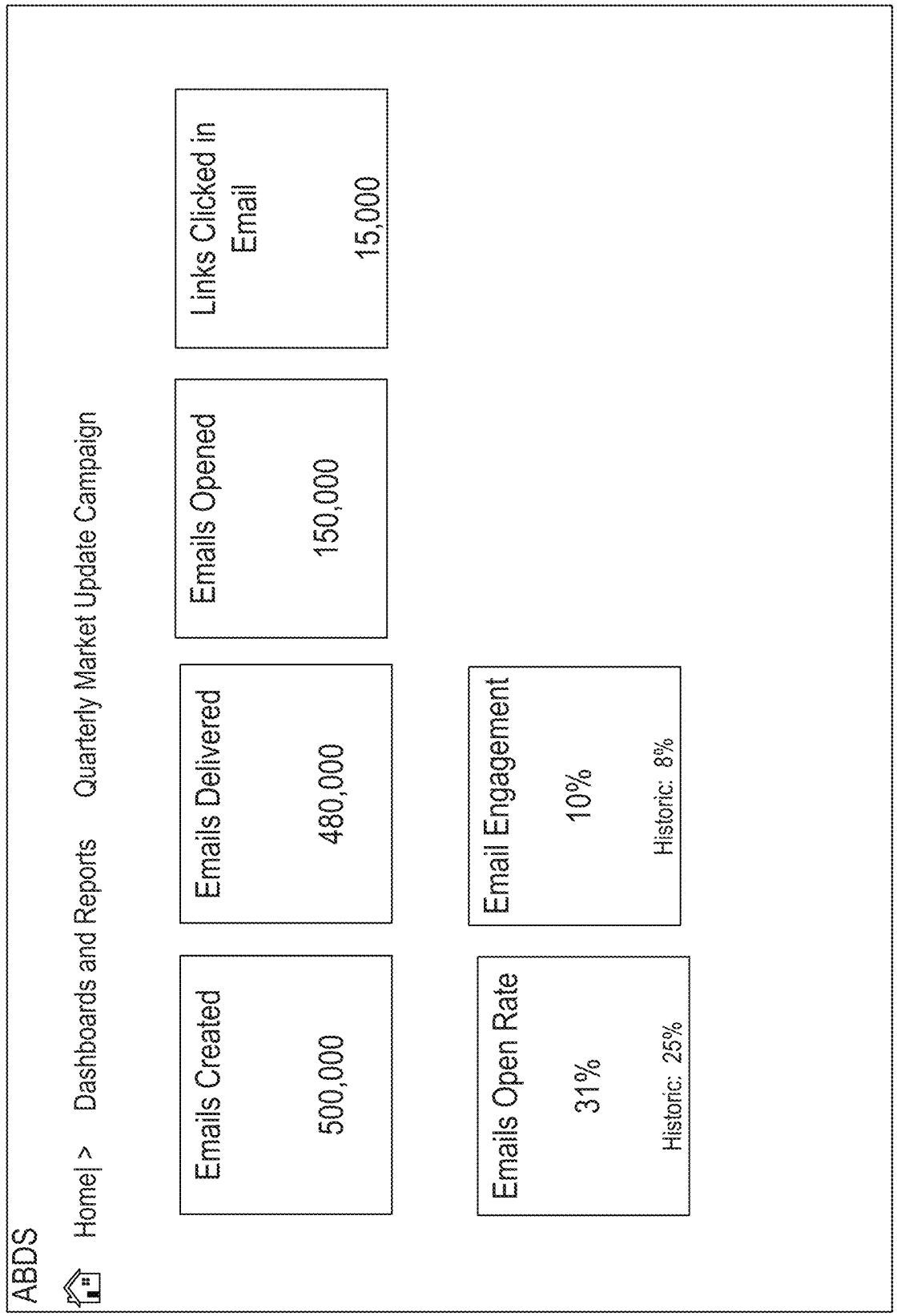
FIG. 15 is a diagrammatic representation of one embodiment of a user interface display analysis results for a customer journey.

The event processing system may provide rich reporting on a customer journey and across customer journeys. For example, for each touchpoint, analyzer can perform various analysis, such as producing event counts and the analysis results further transformed into reports. FIG. 15, for example, illustrates one example of dashboard (e.g., provided by UI 116) that includes metrics from various touchpoints in the customer journey of FIG. 13.

As another example, an event processing system can be used to build a customer interaction database that captures customer interactions across integrations and channels. For example, the analyzer can be configured to transform data from various events into records in a customer interaction database. FIG. 16, for example, is a diagrammatic representation of one embodiment of a customer interaction database that includes interactions across a tenant's integrations.

Figure 17:
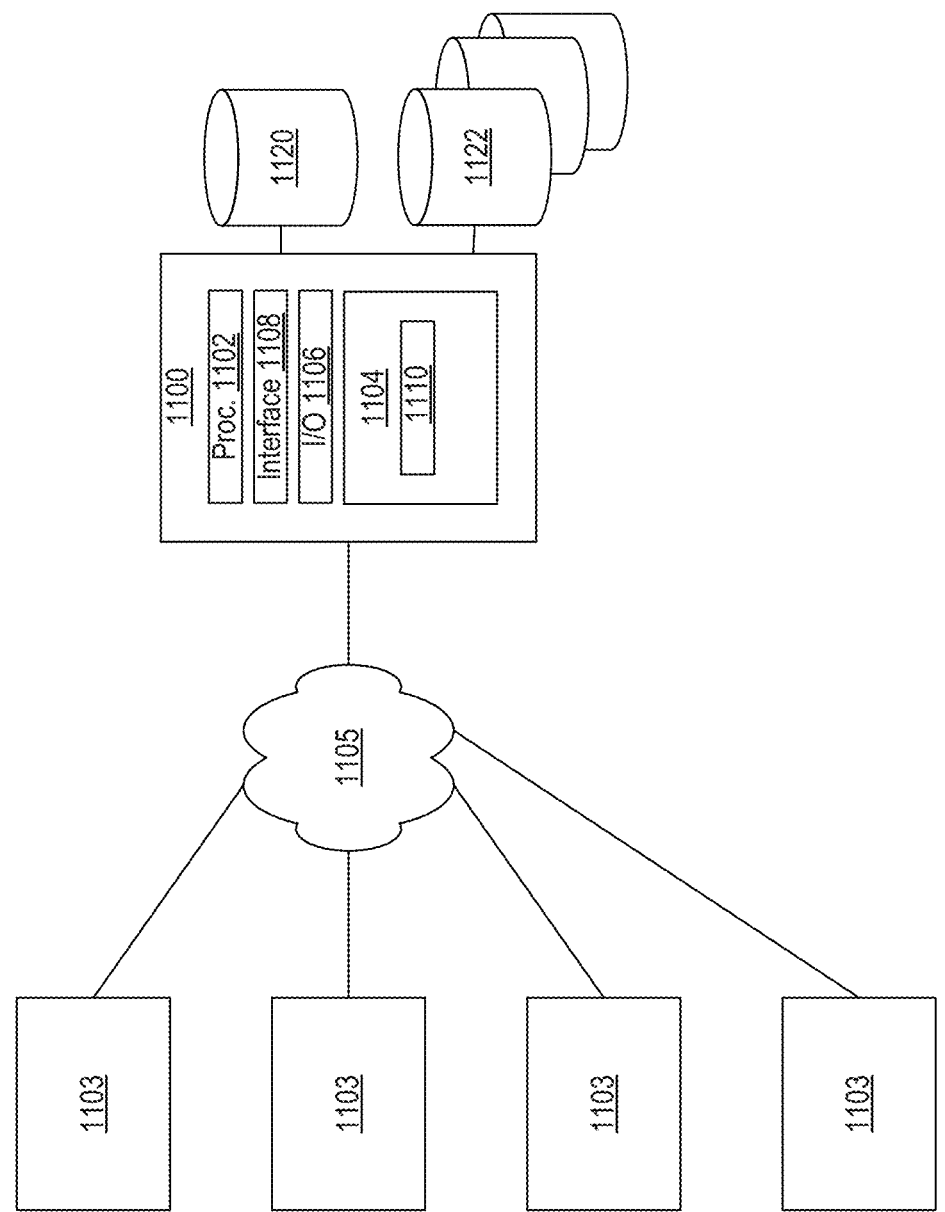
FIG. 17 is a diagrammatic representation of one embodiment of a distributed network computing environment.

Embodiments of the technology may be implemented on a computing system. Any combination of mobile desktop, server, embedded or other types of hardware may be used. FIG. 17 is a diagrammatic representation of one embodiment of a distributed network computing environment where embodiments disclosed herein can be implemented. The computing environment includes a computer system 1100 connected to data sources 1103 via a network 1105 (e.g., a local area network (LAN), a wide area network (WAN) such as the Internet, mobile network, or other type of network or combination thereof). Network 1105 may represent a combination of wired and wireless networks that network computing environment may utilize for various types of network communications.

Computer system 1100 may include, for example, a computer processor 1102 and associated memory 1104. Computer processor 1102 may be an integrated circuit for processing instructions. For example, processor 1102 may comprise one or more cores or micro-cores of a processor. Memory 1104 may include volatile memory, non-volatile memory, semi-volatile memory or a combination thereof. Memory 1104, for example, may include RAM, ROM, flash memory, a hard disk drive, a solid-state drive, an optical storage medium (e.g., CD-ROM), or other computer readable memory or combination thereof. Memory 1104 may implement a storage hierarchy that includes cache memory, primary memory or secondary memory. In some embodiments, memory 1104 may include storage space on a data storage array.

Computer system 1100 may also include input/output ("I/O") devices 1106, such as a keyboard, monitor, printer, electronic pointing device (e.g., mouse, trackball, stylus, etc.), or the like. Computer system 1100 may also include a communication interface 1108, such as a network interface card, to interface with network 1105.

Memory 1104 may store instructions executable by processor 1102. For example, memory 1104 may include code 1110 to implement an event processing system, such as an ABDS for example. Memory 1104 may include instructions executable to implement an ABDS, one or more components of an event processing pipeline, such as one or more of an ingestor, partitioner, coalescer, aggregator or analyzer, or other components of an event processing system.

Computer system 1100 may be coupled to a data store 1120 that stores data usable by the event processing system. According to one embodiment, data store 1120 may comprise one or more databases, one or more file systems or a combination thereof. In some embodiments, data store 1120 may be a portion of memory 1104. Memory 1104 or data store 1120 may be configured with tenant information, event schemas, partitioning management configurations, aggregation rules and analysis rules.

Computer system 1100 may be coupled to one or more event stores 1122 usable to store event collections, microbatches, partitions, aggregations and analysis results. Event stores may include one or more databases, one or more file systems or a combination thereof. Event stores 1122 may comprise, for example, a TPS store, and STS store, an LTS store, an AGSTS store, an AGLTS store, an analysis results store. Event stores 1122 may be portions of memory 1104. In some embodiments, event stores may comprise cloud data storage.

For the purpose of illustration, a single computer system is shown for computer system 1100. However, computer system 1100 may include a plurality of interconnected computers. Each of the computers may have more than one processor, memory or other hardware component, though, for the sake of brevity, each computer is illustrated as having one of each of the hardware components, even if more than one is used. Methods or portions thereof described herein may be implemented through execution of suitable software code that may reside within memory 1104.

Although the invention has been described with respect to specific embodiments thereof, these embodiments are merely illustrative, and not restrictive of the invention. The description herein (including the Appendices) is not intended to be exhaustive or to limit the invention to the precise forms disclosed herein (and in particular, the inclusion of any particular embodiment, feature or function is not intended to limit the scope of the invention to such embodiment, feature or function). Rather, the description is intended to describe illustrative embodiments, features and functions in order to provide a person of ordinary skill in the art context to understand the invention without limiting the invention to any particularly described embodiment, feature or function. While specific embodiments of, and examples for, the invention are described herein for illustrative purposes only, various equivalent modifications are possible within the spirit and scope of the invention, as those skilled in the relevant art will recognize and appreciate. As indicated, these modifications may be made to the invention in light of the foregoing description of illustrated embodiments of the invention and are to be included within the spirit and scope of the invention.

Thus, while the invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the invention.

Reference throughout this specification to "one embodiment", "an embodiment", or "a specific embodiment" or similar terminology means that a particular feature, structure, or characteristic described in connection with the embodiment is included in at least one embodiment and may not necessarily be present in all embodiments. Thus, respective appearances of the phrases "in one embodiment", "in an embodiment", or "in a specific embodiment" or similar terminology in various places throughout this specification are not necessarily referring to the same embodiment. Furthermore, the particular features, structures, or characteristics of any particular embodiment may be combined in any suitable manner with one or more other embodiments. It is to be understood that other variations and modifications of the embodiments described and illustrated herein are possible in light of the teachings herein and are to be considered as part of the spirit and scope of the invention.

Additionally, any examples or illustrations given herein are not to be regarded in any way as restrictions on, limits to, or express definitions of, any term or terms with which they are utilized. Instead, these examples or illustrations are to be regarded as being described with respect to one particular embodiment and as illustrative only. Those of ordinary skill in the art will appreciate that any term or terms with which these examples or illustrations are utilized will encompass other embodiments which may or may not be given therewith or elsewhere in the specification and all such embodiments are intended to be included within the scope of that term or terms. Language designating such nonlimiting examples and illustrations includes, but is not limited to: "for example," "for instance," "e.g.," "in one embodiment."

In the description herein, numerous specific details are provided, such as examples of components and/or methods, to provide a thorough understanding of embodiments of the invention. One skilled in the relevant art will recognize, however, that an embodiment may be able to be practiced without one or more of the specific details, or with other apparatus, systems, assemblies, methods, components, materials, parts, and/or the like. In other instances, well-known structures, components, systems, materials, or operations are not specifically shown or described in detail to avoid obscuring aspects of embodiments of the invention. While the invention may be illustrated by using a particular embodiment, this is not and does not limit the invention to any particular embodiment and a person of ordinary skill in the art will recognize that additional embodiments are readily understandable and are a part of this invention.

Those skilled in the relevant art will appreciate that embodiments can be implemented or practiced in a variety of computer system configurations including, without limitation, multi-processor systems, network devices, mini-computers, mainframe computers, data processors, and the like. Embodiments can be employed in distributed computing environments, where tasks or modules are performed by remote processing devices, which are linked through a communications network such as a LAN, WAN, and/or the Internet. In a distributed computing environment, program modules or subroutines may be located in both local and remote memory storage devices. These program modules or subroutines may, for example, be stored or distributed on computer-readable media, stored as firmware in chips, as well as distributed electronically over the Internet or over other networks (including wireless networks). Example chips may include Electrically Erasable Programmable Read-Only Memory (EEPROM) chips.

Embodiments described herein can be implemented in the form of control logic in software or hardware or a combination of both. The control logic may be stored in an information storage medium, such as a computer-readable medium, as a plurality of instructions adapted to direct an information processing device to perform a set of steps disclosed in the various embodiments. Based on the disclosure and teachings provided herein, a person of ordinary skill in the art will appreciate other ways and/or methods to implement the invention. Steps, operations, methods, routines or portions thereof described herein be implemented using a variety of hardware, such as CPUs, application specific integrated circuits, programmable logic devices, field programmable gate arrays, optical, chemical, biological, quantum or nanoengineered systems, or other mechanisms.

Software instructions in the form of computer-readable program code may be stored, in whole or in part, temporarily or permanently, on a non-transitory computer readable medium. The computer-readable program code can be operated on by a processor to perform steps, operations, methods, routines or portions thereof described herein. A "computer-readable medium" is a medium capable of storing data in a format readable by a computer and can include any type of data storage medium that can be read by a processor. Examples of non-transitory computer-readable media can include, but are not limited to, volatile and non-volatile computer memories, such as RAM, ROM, hard drives, solid state drives, data cartridges, magnetic tapes, floppy diskettes, flash memory drives, optical data storage devices, compact-disc read-only memories. In some embodiments, computer-readable instructions or data may reside in a data array, such as a direct attach array or other array. The computer-readable instructions may be executable by a processor to implement embodiments of the technology or portions thereof.

A "processor" includes any, hardware system, mechanism or component that processes data, signals or other information. A processor can include a system with a general-purpose central processing unit, multiple processing units, dedicated circuitry for achieving functionality, or other systems. Processing need not be limited to a geographic location, or have temporal limitations. For example, a processor can perform its functions in "real-time," "offline," in a "batch mode," etc. Portions of processing can be performed at different times and at different locations, by different (or the same) processing systems.

Different programming techniques can be employed such as procedural or object oriented. Any suitable programming language can be used to implement the routines, methods or programs of embodiments of the invention described herein, including R, Python, C, C++, Java, JavaScript, HTML, or any other programming or scripting code, etc. Communications between computers implementing embodiments can be accomplished using any electronic, optical, radio frequency signals, or other suitable methods and tools of communication in compliance with known network protocols. Any particular routine can execute on a single computer processing device or multiple computer processing devices, a single computer processor or multiple computer processors. Data may be stored in a single storage medium or distributed through multiple storage mediums. In some embodiments, data may be stored in multiple database, multiple filesystems or a combination thereof.

Although the steps, operations, or computations may be presented in a specific order, this order may be changed in different embodiments. In some embodiments, some steps may be omitted. Further, in some embodiments, additional or alternative steps may be performed. In some embodiments, to the extent multiple steps are shown as sequential in this specification, some combination of such steps in alternative embodiments may be performed at the same time. The sequence of operations described herein can be interrupted, suspended, or otherwise controlled by another process, such as an operating system, kernel, etc. The routines can operate in an operating system environment or as stand-alone routines. Functions, routines, methods, steps and operations described herein can be performed in hardware, software, firmware or any combination thereof.

It will be appreciated that one or more of the elements depicted in the drawings/figures can also be implemented in a more separated or integrated manner, or even removed or rendered as inoperable in certain cases, as is useful in accordance with a particular application. Additionally, any signal arrows in the drawings/figures should be considered only as exemplary, and not limiting, unless otherwise specifically noted.

As used herein, the terms "comprises," "comprising," "includes," "including," "has," "having," or any other variation thereof, are intended to cover a non-exclusive inclusion. For example, a process, product, article, or apparatus that comprises a list of elements is not necessarily limited to only those elements but may include other elements not expressly listed or inherent to such process, product, article, or apparatus.

Furthermore, the term "or" as used herein is generally intended to mean "and/or" unless otherwise indicated. For example, a condition A or B is satisfied by any one of the following: A is true (or present) and B is false (or not present), A is false (or not present) and B is true (or present), and both A and B are true (or present). As used herein, a term preceded by "a" or "an" (and "the" when antecedent basis is "a" or "an") includes both singular and plural of such term, unless clearly indicated within the claim otherwise (i.e., that the reference "a" or "an" clearly indicates only the singular or only the plural). Also, as used in the description herein and throughout the meaning of "in" includes "in" and "on" unless the context clearly dictates otherwise.

Although the foregoing specification describes specific embodiments, numerous changes in the details of the embodiments disclosed herein and additional embodiments will be apparent to, and may be made by, persons of ordinary skill in the art having reference to this disclosure. In this context, the specification and figures are to be regarded in an illustrative rather than a restrictive sense, and all such modifications are intended to be included within the scope of this disclosure.

What is claimed is:

1. An event processing system comprising:
    a processor;
    a non-transitory computer readable medium coupled to the processor, the non-transitory computer readable medium storing computer-readable code, the computer-readable code executing:
       an event processor for analyzing event data over a network, the event processor being domain-agnostic, comprising:
          an event data model supporting type discovery and schema management for events, the event data model discovering schemas at runtime and modelling events for multiple tenants in a multi-tenant environment; and
          an event processing model supporting event partitioning by event type and time and generating new aggregations and analyses based on propagation of new partitions;
       receiving heterogeneous events for a plurality of tenant integrations in a multi-tenant environment, the heterogeneous events conforming to a plurality of schemas; and
       processing the heterogeneous events using the event processor during runtime, the processing including updating the event data model for new event types and event schemas discovered from the heterogeneous events and automatically propagating new partitions from the heterogeneous events.

2. The event processing system of claim 1, wherein the computer-readable code is executable to:
    receive a set of heterogeneous events comprising events from plurality of tenants; and
    isolate events in the set of heterogeneous events to collections of homogeneous events based on event types, such that each collection of homogeneous events includes events of a corresponding event type from a plurality of event types, each event type in the plurality of event types associated with a corresponding tenant in the event data model.

3. The event processing system of claim 2, wherein the computer-readable code is executable to:
    for a first event in the set of heterogeneous events, determine a first event type from the first event;
    based on a determination that the first event type is not in the event data model, add the first event type to the event data model; and
    start a first collection of homogeneous events for events of the first event type and write the first event to the first collection of homogeneous events.

4. The event processing system of claim 3, wherein the event processing model is configured to react to a propagation of a first collection of homogeneous events containing events of a first event type to:
    determine a first event schema for the first event type; and
    store the events of the first event type from the first collection of homogeneous events to a first micro-batch according to a first structured format that reflects the first event schema.

5. The event processing system of claim 1, wherein the event processing model is configured to react to a propagation of a new micro-batch by creating a real-time aggregation of events using events from the new micro-batch and propagating the real-time aggregation of events.

6. The event processing system of claim 4, wherein the computer-readable code is executable to:
    create a plurality of micro-batches containing events of the first event type;
    store the plurality of micro-batches in a first data store;
    select the plurality of micro-batches from the first data store based on the first event type; and
    coalesce the plurality of micro-batches from the first data store into a first partition in a second data store.

7. The event processing system of claim 6, wherein event processing model is configured to:
    receive an aggregation rule applicable to the first event type;
    execute the aggregation rule to:
    select, from the first data store, a first set of events that meet the aggregation rule;
    select, from the second data store, a second set of events that meet the aggregation rule; and
    write the first set of events and second set of events to a first aggregation.

8. The event processing system of claim 7, wherein event processing model is configured to:
    receive an analysis rule applicable to the first event type;
    execute the analysis rule to:
    apply the analysis rule to the first aggregation; and store an analysis result generated by applying the analysis rule to the first aggregation.

9. The event processing system of claim 8, wherein applying the analysis rule to the first aggregation comprises applying a relational function or a relational transformation to events in the first aggregation.

10. The event processing system of claim 8, wherein the event processing model is configured to react to a propagation of a real-time aggregation of events by applying the analysis rule to the real-time aggregation of events to generate a real-time analysis result.

11. A computer program product comprising a non-transitory computer readable medium, the non-transitory computer readable medium storing computer-readable code, the computer-readable code executing:
an event processor for analyzing event data over a network, the event processor being domain-agnostic, comprising:
an event data model supporting type discovery and schema management for events, the event data model discovering schemas at runtime and modelling events for multiple tenants in a multi-tenant environment; and
an event processing model supporting event partitioning by event type and time and generating new aggregations and analyses based on propagation of new partitions;
receiving heterogeneous events for a plurality of tenant integrations in a multi-tenant environment, the heterogeneous events conforming to a plurality of schemas; and
processing the heterogeneous events using the event processor during runtime, the processing including updating the event data model for new event types and event schemas discovered from the heterogeneous events and automatically propagating new partitions from the heterogeneous events.

12. The computer program product of claim 11, wherein the computer-readable code is executable to:
receive a set of heterogeneous events comprising events from plurality of tenants; and
isolate events in the set of heterogeneous events to collections of homogeneous events based on event types, such that each collection of homogeneous events includes events of a corresponding event type from a plurality of event types, each event type in the plurality of event types associated with a corresponding tenant in the event data model.

13. The computer program product of claim 12, wherein the computer-readable code is executable to:
for a first event in the set of heterogeneous events, determine a first event type from the first event;
based on a determination that the first event type is not in the event data model, add the first event type to the event data model; and
start a first collection of homogeneous events for events of the first event type and write the first event to the first collection of homogeneous events.

14. The computer program product of claim 13, wherein the event processing model is configured to react to a propagation of a first collection of homogeneous events containing events of a first event type to:
determine a first event schema for the first event type; and
store the events of the first event type from the first collection of homogeneous events to a first micro-batch according to a first structured format that reflects the first event schema.

15. The computer program product of claim 11, wherein the event processing model is configured to react to a propagation of a new micro-batch by creating a real-time aggregation of events using events from the new micro-batch and propagating the real-time aggregation of events.

16. The computer program product of claim 14, wherein the computer-readable code is executable to:
create a plurality of micro-batches containing events of the first event type;
store the plurality of micro-batches in a first data store;
select the plurality of micro-batches from the first data store based on the first event type; and
coalesce the plurality of micro-batches from the first data store into a first partition in a second data store.

17. The computer program product of claim 16, wherein event processing model is configured to:
receive an aggregation rule applicable to the first event type;
execute the aggregation rule to:
select, from the first data store, a first set of events that meet the aggregation rule;
select, from the second data store, a second set of events that meet the aggregation rule; and
write the first set of events and second set of events to a first aggregation.

18. The computer program product of claim 17, wherein event processing model is configured to:
receive an analysis rule applicable to the first event type;
execute the analysis rule to:
apply the analysis rule to the first aggregation; and
store an analysis result generated by applying the analysis rule to the first aggregation.

19. The computer program product of claim 18, wherein applying the analysis rule to the first aggregation comprises applying a relational function or a relational transformation to events in the first aggregation.

20. The computer program product of claim 18, wherein the event processing model is configured to react to a propagation of a real-time aggregation of events by applying the analysis rule to the real-time aggregation of events to generate a real-time analysis result.

\* \* \* \* \*